United States Patent
Jie et al.

(10) Patent No.: US 11,145,078 B2
(45) Date of Patent: Oct. 12, 2021

(54) DEPTH INFORMATION DETERMINING METHOD AND RELATED APPARATUS

(71) Applicant: TENCENT TECHNOLOGY (SHENZHEN) COMPANY LIMITED, Shenzhen (CN)

(72) Inventors: Zequn Jie, Shenzhen (CN); Yonggen Ling, Shenzhen (CN); Wei Liu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 7 days.

(21) Appl. No.: 16/899,287

(22) Filed: Jun. 11, 2020

(65) Prior Publication Data

US 2020/0302629 A1    Sep. 24, 2020

Related U.S. Application Data

(63) Continuation of application No. PCT/CN2019/077669, filed on Mar. 11, 2019.

(30) Foreign Application Priority Data

Apr. 4, 2018    (CN) .......................... 201810301988.3

(51) Int. Cl.
    *G06T 7/593*    (2017.01)
(52) U.S. Cl.
    CPC .... *G06T 7/593* (2017.01); *G06T 2207/10012* (2013.01)
(58) Field of Classification Search
    None
    See application file for complete search history.

(56) References Cited

U.S. PATENT DOCUMENTS

| | | | |
|---|---|---|---|
| 2013/0266211 A1 | 10/2013 | Tippetts et al. | |
| 2019/0011921 A1* | 1/2019 | Wang | H04N 5/23299 |
| 2020/0409159 A1* | 12/2020 | Samec | A61B 3/063 |

FOREIGN PATENT DOCUMENTS

| | | |
|---|---|---|
| CN | 106600650 A | 4/2017 |
| CN | 107590831 A | 1/2018 |
| CN | 108537837 A | 9/2018 |

OTHER PUBLICATIONS

International Search Report Issued in Application PCT/CN2019/077669 dated Jun. 14, 2019, with English Machine Translation, (5 pages).

(Continued)

*Primary Examiner* — Idowu O Osifade
(74) *Attorney, Agent, or Firm* — Oblon, McClelland, Maier & Neustadt, L.L.P.

(57) ABSTRACT

A depth information determining method for dual cameras is provided. A $t^{th}$ left eye matching similarity from a left eye image captured by a first camera of the dual cameras to a right eye image captured by a second camera of the dual cameras is obtained. A $t^{th}$ right eye matching similarity from the right eye image to the left eye image is obtained. The $t^{th}$ left eye matching similarity and a $(t-1)^{th}$ left eye attention map are processed with a neural network model, to obtain a $t^{th}$ left eye disparity map. The $t^{th}$ right eye matching similarity and a $(t-1)^{th}$ right eye attention map are processed with the neural network model, to obtain a $t^{th}$ right eye disparity map. First depth information is determined according to the $t^{th}$ left eye disparity map. Second depth information is determined according to the $t^{th}$ right eye disparity map.

20 Claims, 6 Drawing Sheets

(56) References Cited

OTHER PUBLICATIONS

Written Opinion Issued in Application PCT/CN2019/077669 dated Jun. 14, 2019 (4 pages).

* cited by examiner

DEPTH INFORMATION DETERMINING METHOD AND RELATED APPARATUS

RELATED APPLICATION

This application is a continuation of International Application No. PCT/CN2019/077669, filed on Mar. 11, 2019, which claims priority to Chinese Patent Application No. 201810301988.3, entitled "DEPTH INFORMATION DETERMINING METHOD AND RELATED APPARATUS" and filed on Apr. 4, 2018. The entire disclosures of the prior applications are hereby incorporated by reference in their entirety.

FIELD OF THE TECHNOLOGY

This application relates to the field of computer processing, including determining of depth information.

BACKGROUND OF THE DISCLOSURE

A disparity is a difference between directions in which a viewer views the same object at two different locations. For example, after reaching out a finger in front of a person's eyes, if the person first closes the right eye and views the finger with the left eye, and then closes the left eye and views the finger with the right eye, the person finds that a location of the finger relative to a background object is changed, which is a disparity in viewing the same point from different angles.

Currently, in a process of predicting depth information of an object, matching similarities from the left eye to the right eye at different disparities need to be first predicted, and then disparity prediction is performed on a left eye image by using the matching similarities from the left eye to the right eye at the different disparities. In this way, the depth information of the object is determined.

However, for a region (e.g., a repetitive region, a textureless region, and an edge of a complex object) that is difficult for matching between the two eyes, the depth information is prone to a relatively large error if only the matching similarities from the left eye to the right eye at the different disparities are used.

SUMMARY

Embodiments of this application provide a depth information determining method and a related apparatus, which, through recursive learning, may continuously correct disparity maps of two eyes by using complementary information of the two eyes, to effectively reduce an error of depth information for a region difficult to match between the two eyes.

A first aspect of the embodiments of this application provides a depth information determining method for dual cameras. A $t^{th}$ left eye matching similarity from a left eye image captured by a first camera of the dual cameras to a right eye image captured by a second camera of the dual cameras is obtained, and $t^{th}$ right eye matching similarity from the right eye image to the left eye image is obtained, t being an integer greater than 1. The $t^{th}$ left eye matching similarity and a $(t-1)^{th}$ left eye attention map are processed with a neural network model, to obtain a $t^{th}$ left eye disparity map. The $t^{th}$ t right eye matching similarity and a $(t-1)^{th}$ right eye attention map are processed with the neural network model, to obtain a $t^{th}$ right eye disparity map. First depth information is determined according to the $t^{th}$ left eye disparity map. Second depth information is determined according to the $t^{th}$ right eye disparity map.

A second aspect of the embodiments of this application provides a depth information determining apparatus, including processing circuitry. The processing circuitry is configured obtain a $t^{th}$ left eye matching similarity from a left eye image captured by a first camera of dual cameras to a right eye image captured by a second camera of the dual cameras, and a $t^{th}$ right eye matching similarity from the right eye image to the left eye image, t being an integer greater than 1. The processing circuitry is configured to process the $t^{th}$ left eye matching similarity and a $(t-1)^{th}$ left eye attention map with a neural network model, to obtain a $t^{th}$ left eye disparity map. The processing circuitry is configured to process the $t^{th}$ right eye matching similarity and a $(t-1)^{th}$ right eye attention map with the neural network model, to obtain a $t^{th}$ right eye disparity map. The processing circuitry is configured to determine first depth information according to the $t^{th}$ left eye disparity map. The processing circuitry is further configured to determine second depth information according to the $t^{th}$ right eye disparity map.

A third aspect of the embodiments of this application provides a depth information determining apparatus, including a memory, a processor, and a bus system; the memory being configured to store a program; the processor being configured to execute the program in the memory, to specifically perform a depth information determining method for dual cameras. A $t^{th}$ left eye matching similarity from a left eye image captured by a first camera of the dual cameras to a right eye image captured by a second camera of the dual cameras is obtained, and $t^{th}$ right eye matching similarity from the right eye image to the left eye image is obtained, t being an integer greater than 1. The $t^{th}$ left eye matching similarity and a $(t-1)^{th}$ left eye attention map are processed with a neural network model, to obtain a $t^{th}$ left eye disparity map. The $t^{th}$ right eye matching similarity and a $(t-1)^{th}$ right eye attention map are processed with the neural network model, to obtain a $t^{th}$ right eye disparity map. First depth information is determined according to the $t^{th}$ left eye disparity map. Second depth information is determined according to the $t^{th}$ right eye disparity map.

A fourth aspect of the embodiments of this application provides a non-transitory computer-readable storage medium storing instructions, which when run on a computer, cause the computer to perform the methods according to the foregoing aspects.

It may be seen from the foregoing technical solutions that the embodiments of this application can include the following advantages:

In the embodiments of this application, a depth information determining method is provided, including: obtaining a $t^{th}$ left eye matching similarity from a left eye image to a right eye image, and a $t^{th}$ right eye matching similarity from the right eye image to the left eye image; then processing the $t^{th}$ left eye matching similarity and a $(t-1)^{th}$ left eye attention map by using a neural network model, to obtain a $t^{th}$ left eye disparity map, and processing the $t^{th}$ right eye matching similarity and a $(t-1)^{th}$ right eye attention map by using the neural network model, to obtain a $t^{th}$ right eye disparity map; and finally determining first depth information according to the $t^{th}$ left eye disparity map, and determining second depth information according to the $t^{th}$ right eye disparity map. In this way, disparity maps of two eyes may be obtained by using a neural network model and attention maps of the two eyes obtained through previous learning, and current attention maps of the two eyes obtained through learning according to the current disparity maps of the two eyes are used for next disparity maps of the two eyes. Through such recursive learning, the disparity maps of the two eyes may be continuously corrected by fully using complementary information of the two eyes, which effectively reduces an error of depth information for a region difficult to match between the two eyes.

DESCRIPTION OF EMBODIMENTS

Embodiments of this application provide a depth information determining method and a related apparatus, which, through recursive learning, may constantly (or continuously) correct disparity maps of two eyes by using (e.g. more fully using) complementary information of the two eyes, to effectively reduce an error of depth information for a region difficult to match between the two eyes.

The terms "first", "second", "third", "fourth", and the like (if used) in the specification and the claims of this application and the foregoing accompanying drawings are used for distinguishing similar objects, and are not necessarily used to describe a particular sequence or order. The data termed in such a way is interchangeable in proper circumstances so that the embodiments of this application described herein can, for example, be implemented in other orders that are different from the order illustrated or described herein. Moreover, the terms "include", "have" and any other variants are intended to cover the non-exclusive inclusion, for example, a process, method, system, product, or device that includes a list of steps or units is not necessarily limited to those expressly listed steps or units, but may include other steps or units not expressly listed or inherent to such a process, method, product, or device.

It is to be understood that, this application may be applied to a facility (e.g., a binocular robot and an unmanned vehicle) equipped with a binocular camera (or dual cameras) for object depth estimation. In this application, depth values are mainly obtained by obtaining disparities of visual images of two eyes through a deep neural network and then dividing a product of a spacing and a focal length of the binocular camera by the predicted disparities. Specifically, matching similarities from an image of one eye to an image of the other eye (e.g., from the left eye to the right eye, and from the right eye to the left eye) at different disparities are first predicted by using a convolutional neural network, and then a cycle of "disparity prediction of the two eyes to comparison between disparity maps of the two eyes" is recursively performed by using a ConvLSTM network. In this cycle, through continuous comparison between disparity maps of the two eyes, a region (e.g., a repetitive region, a texture-less region, or an edge of a complex object) that is difficult to match in left and right visions is automatically detected by fully using complementary information of the left and right visions, so as to correct and update predicted disparity values of the two eyes, and continuously improve accuracy of disparity prediction, that is, accuracy of a depth.

Figure 1A:
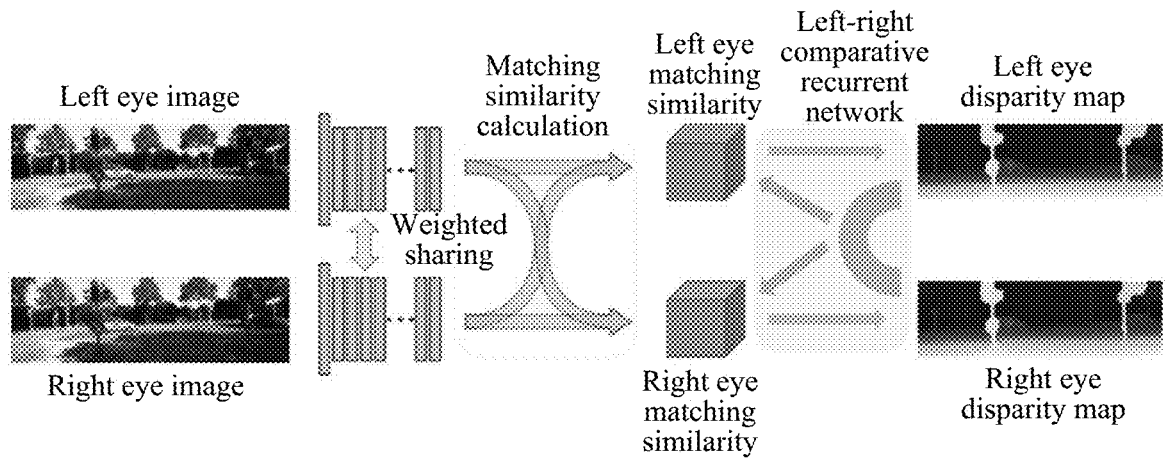
FIG. 1A shows schematic disparity maps of two eyes based on recursive learning according to an embodiment of this application.

For left and right visual images photographed (or captured) by the binocular camera, matching similarities from the left eye image to the right eye image and from the right eye image to the left eye image at different disparities are first predicted by using the convolutional neural network, and then recursive prediction is performed on disparities of the two eyes based on the predicted matching similarities by using the ConvLSTM network. The flowchart is shown in FIG. 1A. FIG. 1A shows schematic disparity maps of two eyes based on recursive learning according to an embodiment of this application. It is assumed that both left and right eye images photographed by the binocular camera have a resolution of H*W (H is height, and W is width). As shown in the figure, pixel-level feature extraction is first performed on the left and right eye images by using the convolutional neural network, to obtain H*W*C (C is feature dimension) feature maps respectively for the two images. Then, features in the two H*W*C feature maps are combined based on different disparities in a horizontal direction, to obtain a maximum of $D_{max}$ feature maps (H*W*2C*$D_{max}$ dimensions) at the different disparities. Then, another convolutional neural network whose convolution kernel is 1*1 is used to predict matching similarities of all pixels at the different disparities, and one matching similarity value is obtained based on a 2C input feature. Similarity values of H*W pixels at all $D_{max}$ possible disparities are written in a tensor form, so that one matching similarity of H*W*$D_{max}$ can be predicted from the left eye image to the right eye image and from the right eye image to the left eye image.

Based on the foregoing predicted matching similarity tensors of the two eyes, the ConvLSTM network is used to perform recursive prediction on disparities of the two eyes, so as to obtain a left eye disparity map and a right eye disparity map.

Figure 1B:
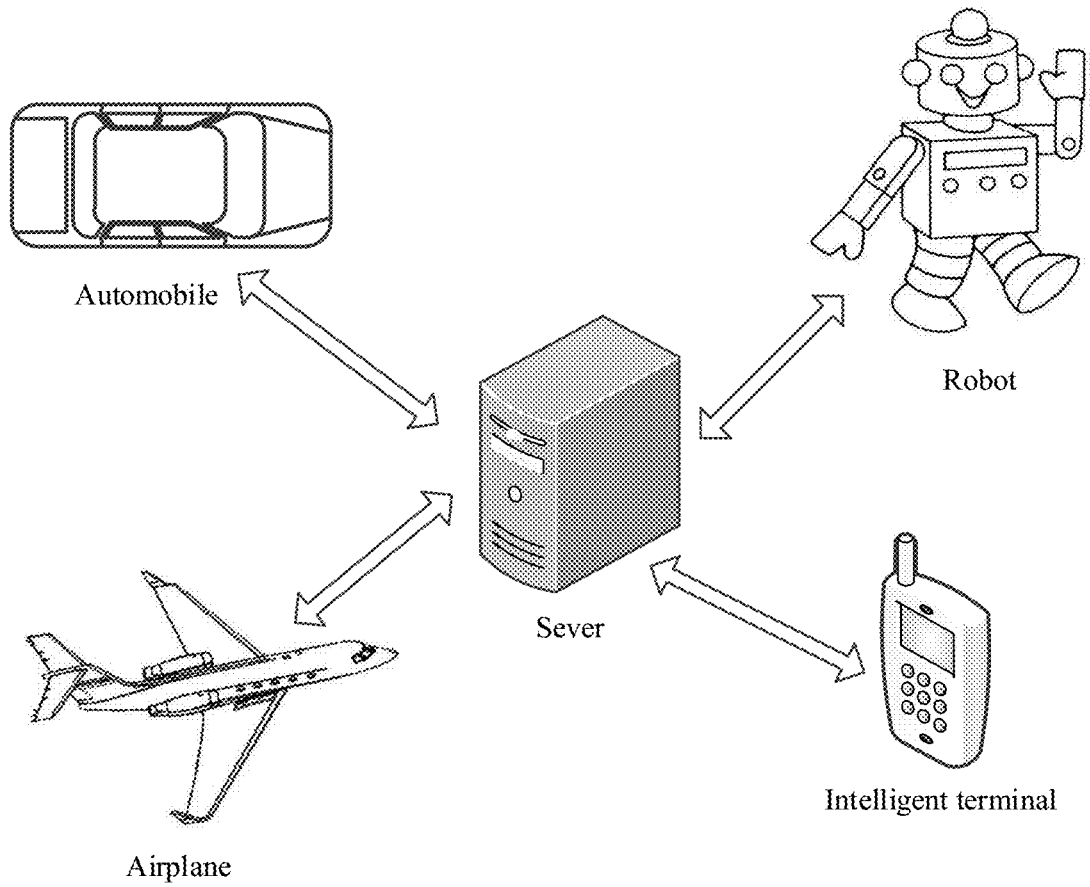
FIG. 1B is a schematic architectural diagram of a depth information determining apparatus according to an embodiment of this application.

With the development in the past few decades, a stereoscopic vision is applied more widely to fields such as robot vision, aerial mapping, reverse engineering, military, medical imaging, and industrial detection. FIG. 1B is a schematic architectural diagram of a depth information determining apparatus according to an embodiment of this application. As shown in the figure, the depth information determining apparatus provided in this application may be deployed on a server, and the server transmits a processing result to a target device. Alternatively, the depth information determining apparatus may be directly deployed on the target device. The target device includes, but is not limited to, an (unmanned) automobile, a robot, an (unmanned) airplane, and an intelligent terminal. All the target devices have binocular stereoscopic vision, which can obtain two images of a to-be-detected object from different locations based on a disparity principle by using an imaging device, and obtain three-dimensional geometric information of the object by calculating a location deviation between corresponding points in the images. The binocular stereoscopic vision combines images obtained by two eyes and observes a difference between the images, so that an obvious depth perception may be obtained, and a correspondence between features may be established, to map the same spatial physical point to mapping points in different images. The difference is referred to as a disparity (or parallax).

A binocular disparity, sometimes also referred to as a stereoscopic disparity, is a depth cue. A closer distance between an object and an observer indicates a larger difference between object images obtained by two eyes. Therefore, the binocular disparity is formed. The brain may estimate a distance between the object and the eyes by measuring the disparity.

Figure 2:
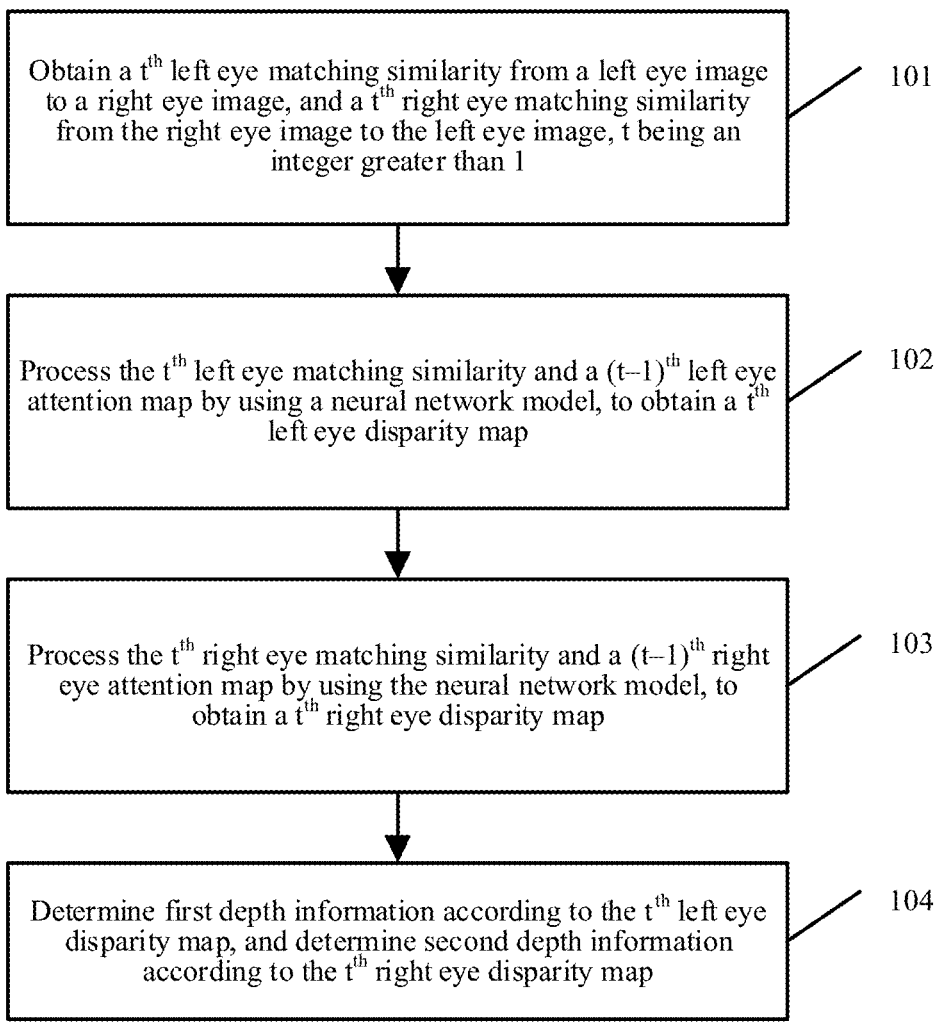
FIG. 2 is a schematic diagram of a depth information determining method according to an embodiment of this application.

The following describes a depth information determining method in this application. Referring to FIG. 2, an embodiment of a depth information determining method according to an embodiment of this application includes the following steps.

In step 101, a $t^{th}$ left eye matching similarity from a left eye image to a right eye image, and a $t^{th}$ right eye matching similarity from the right eye image to the left eye image, are obtained. t is an integer greater than 1. For example, obtaining the $t^{th}$ left eye matching similarity from the left eye image captured by a first camera of dual cameras to the right eye image captured by a second camera of the dual cameras, and the $t^{th}$ right eye matching similarity from the right eye image to the left eye image.

In this embodiment, a depth information determining apparatus first obtains a left eye image and a right eye image by using a binocular camera (or dual cameras), and then calculates a $t^{th}$ left eye matching similarity from the left eye image to the right eye image, and a $t^{th}$ right eye matching similarity from the right eye image to the left eye image, t being an integer greater than 1, which may be considered as a matching similarity obtained for the $t^{th}$ time. The following describes several algorithms for calculating the matching similarity. An actual application includes, but is not limited to, the following listed algorithms.

The first algorithm is a mean absolute difference (MAD) algorithm. The algorithm has a simple idea and relatively high matching precision, and is widely applied to image matching. In a search map S, (i, j) may be taken as the upper left corner, and a submap of M*N is obtained. A similarity between the submap and a template map is calculated. The whole search map S is traversed, and in all submaps that can be obtained, a submap most similar to the template map is found and taken as a final matching result.

The second algorithm is a sum of absolute difference (SAD) algorithm. An idea of the SAD algorithm is nearly the same as that of the MAD algorithm, but a similarity measurement formula of the SAD algorithm is slightly different. Details are not described herein.

The third algorithm is a sum of squared difference (SSD) algorithm, also referred to as a difference quadratic sum algorithm. An idea of the SSD algorithm is the same as that of the SAD algorithm, but a similarity measurement formula of the SSD algorithm is slightly different. Details are not described herein.

The fourth algorithm is a normalized cross correlation (NCC) algorithm. Similar to the foregoing algorithms, a matching degree between two maps is also calculated by using gradations of a submap and a template map through a normalized correlation measurement formula.

The fifth algorithm is a sequential similarity detection algorithm (SSDA), which is an improvement of a related template matching algorithm, and is tens to hundreds of times faster than the MAD algorithm.

In step 102, the $t^{th}$ left eye matching similarity and a $(t-1)^{th}$ left eye attention map are processed by using a neural network model, to obtain a $t^{th}$ left eye disparity map.

In this embodiment, the depth information determining apparatus inputs the current ($t^{th}$) obtained left eye matching similarity and a previous (($t-1)^{th}$) generated left eye attention map to a neural network model. The neural network model is generally obtained through training in advance, and the neural network model outputs a current ($t^{th}$) left eye disparity map.

In step 103, the $t^{th}$ right eye matching similarity and a $(t-1)^{th}$ right eye attention map are processed by using the neural network model, to obtain a $t^{th}$ right eye disparity map.

In this embodiment, similarly, the depth information determining apparatus inputs the current ($t^{th}$) obtained right eye matching similarity and a previous (($t-1)^{th}$) generated right eye attention map to the neural network model. The neural network model is generally obtained through training in advance, and the neural network model outputs a current ($t^{th}$) right eye disparity map.

It may be understood that step 102 may be performed before, after, or simultaneously with step 103. This is not limited herein.

In step 104, first depth information is determined according to the $t^{th}$ left eye disparity map, and second depth information is determined according to the $t^{th}$ right eye disparity map.

In this embodiment, the depth information determining apparatus determines, according to the $t^{th}$ left eye disparity map outputted by the neural network model, depth information of the $t^{th}$ left eye disparity map (i.e., first depth information). Similarly, the depth information determining apparatus determines, according to the $t^{th}$ right eye disparity map outputted by the neural network model, depth information of the $t^{th}$ right eye disparity map (i.e., second depth information).

Figure 3:
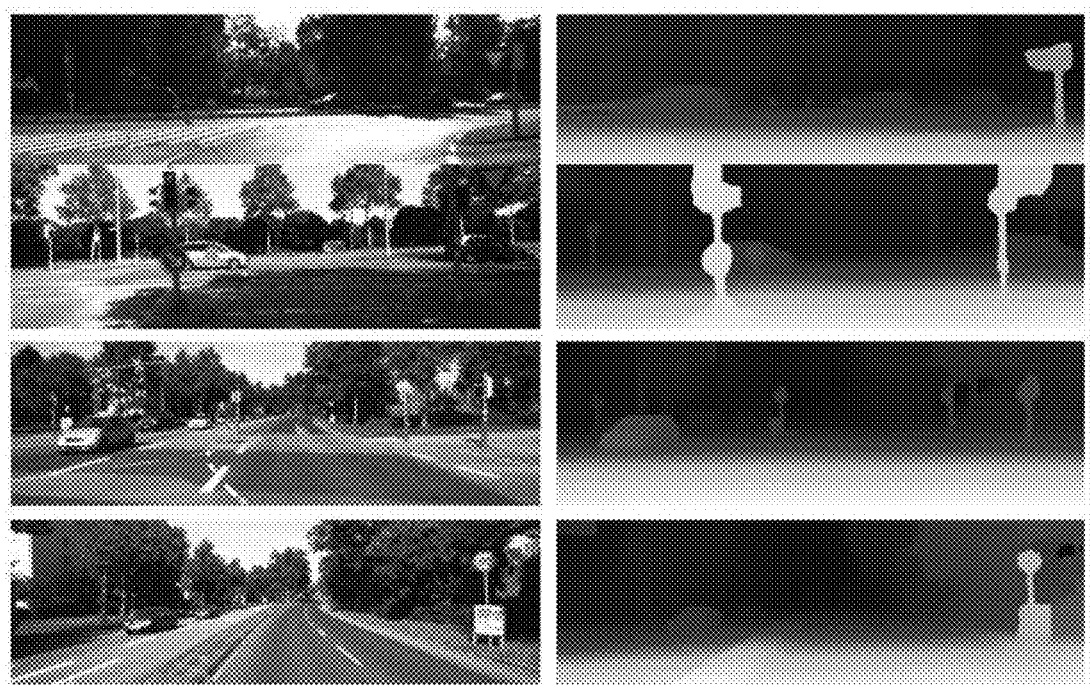
FIG. 3 is a schematic diagram of comparisons between original maps and model-based depth prediction maps according to an embodiment of this application.

For ease of description, FIG. 3 is a schematic diagram of comparison between original maps and model-based depth prediction maps according to an embodiment of this application. As shown in the figure, a high-quality depth map may be obtained through prediction by using a neural network model provided in this application. In this application, accuracy of binocular object depth estimation can be improved, which plays a decisive role in self driving and work of a facility such as a robot equipped with a binocular camera and an unmanned vehicle, and has potential economic benefits.

In the embodiments of this application, a depth information determining method is provided, including: obtaining a $t^{th}$ left eye matching similarity from a left eye image to a right eye image, and a $t^{th}$ right eye matching similarity from the right eye image to the left eye image; then processing the $t^{th}$ left eye matching similarity and a $(t-1)^{th}$ left eye attention map by using a neural network model, to obtain a $t^{th}$ left eye disparity map, and processing the $t^{th}$ right eye matching similarity and a $(t-1)^{th}$ right eye attention map by using the neural network model, to obtain a $t^{th}$ right eye disparity map; and finally determining first depth information according to the $t^{th}$ left eye disparity map, and determining second depth information according to the $t^{th}$ right eye disparity map. In this way, disparity maps of two eyes may be obtained by using a neural network model and attention maps of the two eyes obtained through previous learning, and current attention maps of the two eyes obtained through learning according to the current disparity maps of the two eyes are used for next disparity maps of the two eyes. Through such recursive learning, the disparity maps of the two eyes may be continuously corrected by fully using complementary information of the two eyes, which effectively reduces an error of depth information for a region difficult to match between the two eyes.

Optionally, based on the embodiment corresponding to FIG. 2, a first optional embodiment of the depth information determining method provided in the embodiments of this application may further include the following steps: (i) mapping the $t^{th}$ right eye disparity map to a left eye coordinate system, to obtain a $t^{th}$ left eye mapping disparity map; (ii) generating a $t^{th}$ left eye attention map according to the $t^{th}$ left eye mapping disparity map and the $t^{th}$ left eye disparity map; (iii) mapping the $t^{th}$ left eye disparity map to a right eye coordinate system, to obtain a $t^{th}$ right eye mapping disparity map; and (v) generating a $t^{th}$ right eye attention map according to the $t^{th}$ right eye mapping disparity map and the $t^{th}$ right eye disparity map.

Figure 4:
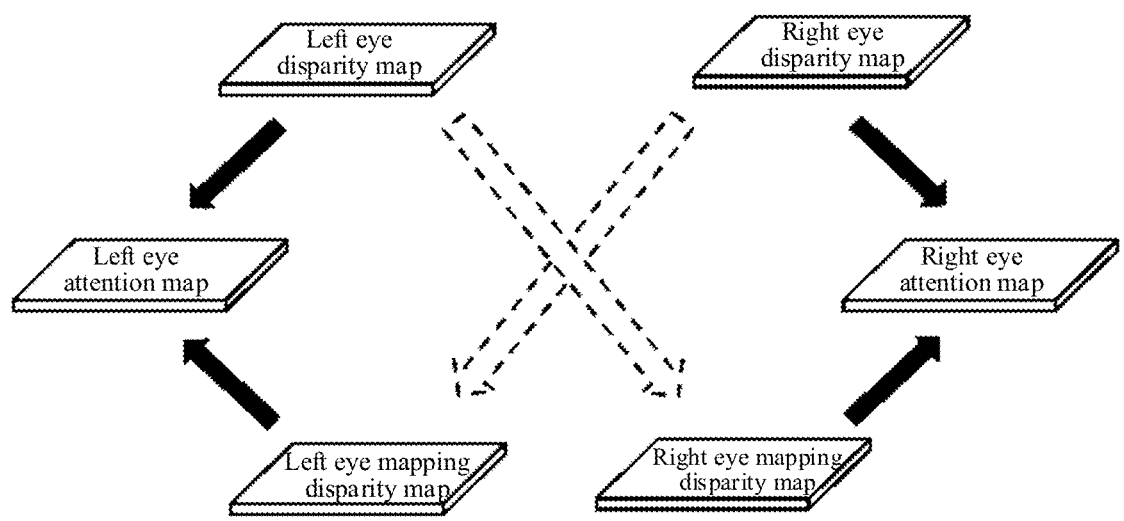
FIG. 4 is a schematic diagram of generating attention maps of two eyes according to an embodiment of this application.

In an embodiment, the depth information determining apparatus generates an attention map by using a mapping disparity map and a disparity map. Specifically, FIG. 4 is a schematic diagram of generating attention maps of two eyes according to an embodiment of this application. As shown in the figure, after a $t^{th}$ right eye disparity map and a $t^{th}$ left eye disparity map are generated by using a neural network model, the $t^{th}$ right eye disparity map may be mapped to a left eye coordinate system, to obtain a $t^{th}$ left eye mapping disparity map, and the $t^{th}$ left eye disparity map is mapped to a right eye coordinate system, to obtain a $t^{th}$ right eye mapping disparity map. The mapping is converting two disparity maps into coordinates of opposite disparity maps. Next, the original $t^{th}$ left eye disparity map and the $t^{th}$ left eye mapping disparity map obtained through conversion are connected, and are inputted to a model formed by several simple convolutional layers and transformation layers, to obtain a $t^{th}$ left eye attention map. Similarly, the original $t^{th}$ right eye disparity map and the $t^{th}$ right eye mapping disparity map obtained through conversion are connected, and are inputted to the model formed by several simple convolutional layers and transformation layers, to obtain a $t^{th}$ right eye attention map.

An attention map reflects confidences of disparity prediction in different regions after left and right images are compared with each other. A low confidence means that a predicted disparity value of a pixel is not confident. Low-confidence pixel regions that are automatically detected after comparison between left and right eye disparities are usually regions difficult to match between the left and right eyes, such as a repetitive region, a texture-less region, and an edge of a complex object. Therefore, an attention map obtained through $t^{th}$ recursive learning can be used for $(t+1)^{th}$ recursive disparity prediction, and a network can purposely correct and update a disparity value of a pixel in a low-confidence region automatically detected by the $t^{th}$ recursion according to this. That is, the attention map may be used for a focus region of a model in a next step.

In addition, in an embodiment of this application, the depth information determining apparatus maps the $t^{th}$ right eye disparity map to a left eye coordinate system, to obtain a $t^{th}$ left eye mapping disparity map, and generates a $t^{th}$ left eye attention map according to the $t^{th}$ left eye mapping disparity map and the $t^{th}$ left eye disparity map. Similarly, a $t^{th}$ right eye attention map may also be obtained. In this way, a current attention map obtained through recursive learning can be used for next recursive disparity prediction, and a network can purposely correct and update a disparity value of a pixel in a low-confidence region automatically detected by the current recursion according to this, thereby improving reliability of the attention maps of the two eyes.

Optionally, based on the first embodiment corresponding to FIG. 2, in a second optional embodiment of the depth information determining method provided in the embodiments of this application, after the determining first depth information according to the $t^{th}$ left eye disparity map, and determining second depth information according to the $t^{th}$ right eye disparity map, the method may further include the following steps: (i) obtaining a $(t+1)^{th}$ left eye matching similarity from the left eye image to the right eye image, and a $(t+1)^{th}$ right eye matching similarity from the right eye image to the left eye image; (ii) processing the $(t+1)^{th}$ left eye matching similarity and the $t^{th}$ left eye attention map by using the neural network model, to obtain a $(t+1)^{th}$ left eye disparity map; (iii) processing the $(t+1)^{th}$ right eye matching similarity and the $t^{th}$ right eye attention map by using the neural network model, to obtain a $(t+1)^{th}$ right eye disparity map; and (iii) determining third depth information according to the $(t+1)^{th}$ left eye disparity map, and determining fourth depth information according to the $(t+1)^{th}$ right eye disparity map.

Figure 5:
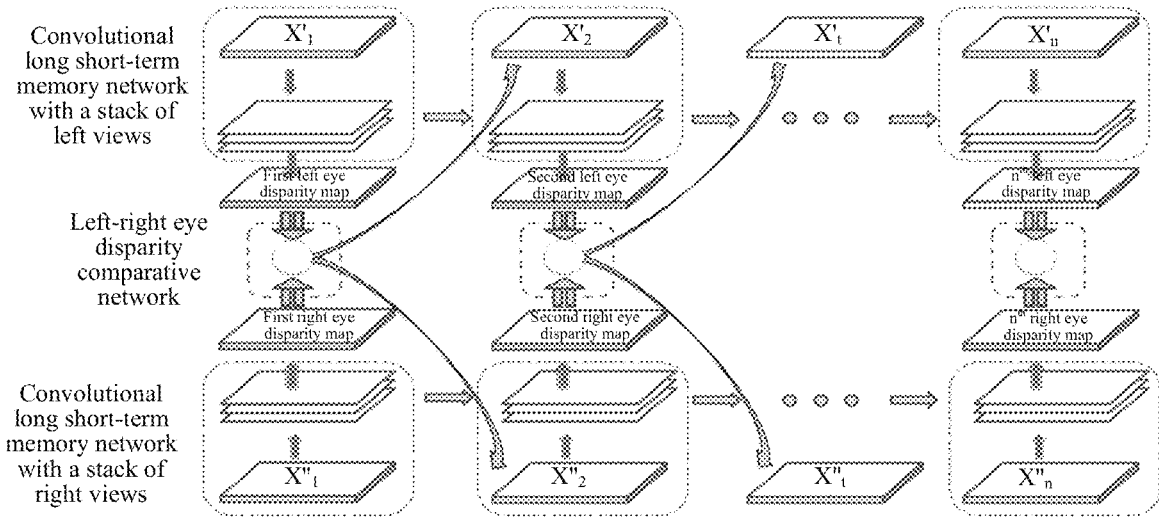
FIG. 5 is a schematic diagram of a recursive binocular disparity network according to an embodiment of this application.

In an embodiment, a manner of predicting next depth information is described. FIG. 5 is a schematic diagram of a recursive binocular disparity network according to an embodiment of this application. As shown in the figure, the recursive binocular disparity network, which may also be referred to as a left-right comparative recurrent (LRCR) model, includes two parallel neural network models. A left-side neural network model generates a $t^{th}$ left eye disparity map by using $X'_t$. $X'_t$ represents a connection result between a $t^{th}$ left eye matching similarity and a $(t-1)^{th}$ left eye attention map. Similarly, a right-side neural network model generates a $t^{th}$ right eye disparity map by using $X''_t$. $X''_t$ represents a connection result between a $t^{th}$ right eye matching similarity and a $(t-1)^{th}$ right eye attention map. Next, a $t^{th}$ left eye attention map and a $t^{th}$ right eye attention map may be predicted by using the $t^{th}$ left eye disparity map and the $t^{th}$ right eye disparity map.

Then, a next cycle may be performed, that is, the left-side neural network model generates a $(t+1)^{th}$ left eye disparity map by using $X'_{t+1}$. $X'_{t+1}$ represents a connection result between a $(t+1)^{th}$ left eye matching similarity and a $t^{th}$ left eye attention map. Similarly, the right-side neural network model generates a $(t+1)^{th}$ right eye disparity map by using $X''_{t+1}$. $X''_{t+1}$ represents a connection result between a $(t+1)^{th}$ right eye matching similarity and a $t^{th}$ right eye attention map. Next, a $(t+1)^{th}$ left eye attention map and a $(t+1)^{th}$ right eye attention map may be predicted by using the $(t+1)^{th}$ left eye disparity map and the $(t+1)^{th}$ right eye disparity map. The rest can be deduced by analogy, and details are not described herein.

Further, in an embodiment of this application, after obtaining current depth information of the two eyes, the depth information determining apparatus may further continue to obtain next depth information of the two eyes. In this way, for comparison between the left and right eyes, a convolutional layer and an aggregation layer may be added to the neural network models, so as to generate attention maps of the two eyes. The attention maps of the two eyes each are used as an input of a next step, and the LRCR model is started. Left-right mismatching regions may be focused more in the next step, thereby improving prediction accuracy.

Optionally, based on FIG. 2 and the first or second embodiment corresponding to FIG. 2, in a third optional embodiment of the depth information determining method provided in the embodiments of this application, the processing the $t^{th}$ left eye matching similarity and a $(t-1)^{th}$ left eye attention map by using a neural network model, to obtain a $t^{th}$ left eye disparity map may include: (i) obtaining a $t^{th}$ left eye hidden variable through calculation according to the $t^{th}$ left eye matching similarity and the $(t-1)^{th}$ left eye attention map by using a ConvLSTM network; (ii) obtaining a $t^{th}$ left eye disparity cost according to the $t^{th}$ left eye hidden variable; and (iii) calculating a $t^{th}$ predicted left eye disparity value according to the $t^{th}$ left eye disparity cost, the $t^{th}$ predicted left eye disparity value being used for generating the $t^{th}$ left eye disparity map.

Further, the processing the $t^{th}$ right eye matching similarity and a $(t-1)^{th}$ right eye attention map by using the neural network model, to obtain a $t^{th}$ right eye disparity map includes: (i) obtaining a $t^{th}$ right eye hidden variable through calculation according to the $t^{th}$ right eye matching similarity and the $(t-1)^{th}$ right eye attention map by using the ConvLSTM network; (ii) obtaining a $t^{th}$ right eye disparity cost according to the $t^{th}$ right eye hidden variable; and (iii) calculating a $t^{th}$ predicted right eye disparity value according to the $t^{th}$ right eye disparity cost, the $t^{th}$ predicted right eye disparity value being used for generating the $t^{th}$ right eye disparity map.

In an embodiment, in a process of obtaining the $t^{th}$ left eye disparity map, the $t^{th}$ left eye matching similarity and the $(t-1)^{th}$ left eye attention map need to be first inputted to the ConvLSTM network, to obtain the $t^{th}$ left eye hidden variable through calculation. Then the $t^{th}$ left eye disparity cost is obtained according to the $t^{th}$ left eye hidden variable. Finally, the $t^{th}$ predicted left eye disparity value is calculated according to the $t^{th}$ left eye disparity cost. Obtaining the $t^{th}$ predicted left eye disparity value means that the $t^{th}$ left eye disparity map may be generated. Similarly, a manner of generating the $t^{th}$ right eye disparity map is similar to a manner of generating the $t^{th}$ left eye disparity map. Details are not described herein.

Figure 6:
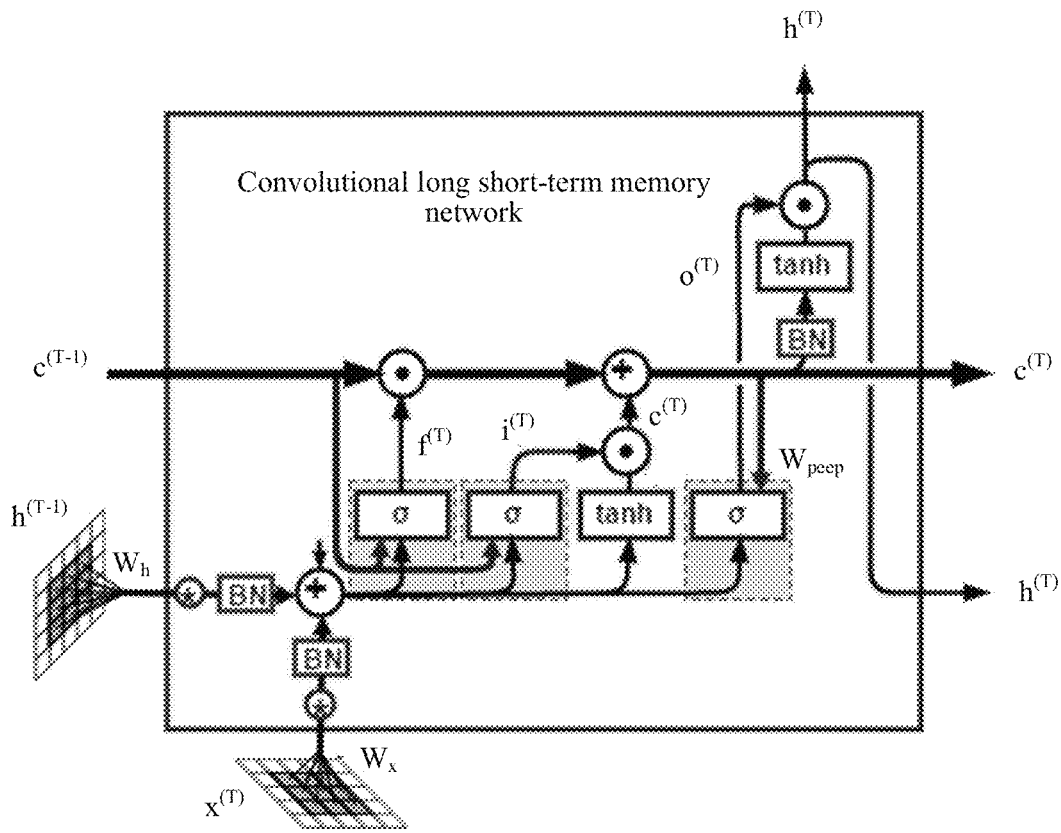
FIG. 6 is a schematic diagram of a convolutional long short-term memory (ConvLSTM) network according to an embodiment of this application.

For ease of understanding, FIG. 6 is a schematic diagram of a ConvLSTM network according to an embodiment of this application. As shown in the figure, each black line transmits a complete vector, which is outputted from one node and inputted to another node. Circles represent pointwise operations, such as summation of vectors. A matrix is a neural network layer obtained through learning. Combined lines represent connections of vectors, and branched lines represent that content is duplicated, and then is distributed to different locations. If there is only the upper horizontal line, information cannot be added or deleted, and information addition or deletion is implemented by using a structure called gates. The gates may selectively allow information to pass through, which is mainly implemented by using a neural layer of sigmoid and an operation of pointwise multiplication. All elements of an output (which is a vector) of the neural layer of sigmoid are real numbers from 0 to 1, which represent weights (or proportions) for allowing corresponding information to pass through. For example, 0 represents "disallowing any information to pass through", and 1 represents "allowing all information to pass through". A tan h layer represents a repetitive structural module.

The ConvLSTM network protects and controls information by using the structure shown in FIG. 6. The three gates are respectively an input gate, a forget gate, and an output gate.

Further, in an embodiment of this application, the ConvLSTM network is used to process the $t^{th}$ left eye matching similarity and the $(t-1)^{th}$ left eye attention map, to obtain the $t^{th}$ left eye disparity map, and process the $t^{th}$ right eye matching similarity and the $(t-1)^{th}$ right eye attention map, to obtain the $t^{th}$ right eye disparity map. In this way, based on predicted matching similarities of the two eyes, recursive prediction is performed on the disparity maps of the two eyes by using the ConvLSTM network. The ConvLSTM network has strong capabilities of sequence modeling and information processing as a related recursive neural network, and also can effectively extract information in each pixel space neighborhood, so as to integrate spatial context information.

Optionally, based on the third embodiment corresponding to FIG. 2, in a fourth optional embodiment of the depth information determining method provided in the embodiments of this application, the obtaining a $t^{th}$ left eye hidden variable through calculation according to the $t^{th}$ left eye matching similarity and the $(t-1)^{th}$ left eye attention map by using a ConvLSTM network may include calculating the $t^{th}$ left eye hidden variable in the following manner:

$$i'_t = \sigma(W_{xi}*X'_t + W_{hi}*H'_{t-1} + W_{ci} \circ C'_{t-1} \pm b_i),$$

$$f'_t = \sigma(W_{xf}*X'_t + W_{hf}*H'_{t-1} + W_{cf} \circ C'_{t-1} + b_f),$$

$$o'_t = \sigma(W_{xo}*X'_t + W_{ho}*H'_{t-1} + W_{co} \circ C'_{t-1} \pm b_o),$$

$$C'_t = f'_t \circ C'_{t-1} + i'_t \circ \tanh(W_{xc}*X'_t + W_{hc}*H'_{t-1} \pm b_c), \text{ and}$$

$$H'_t = o'_t \circ \tanh(C'_t);$$

$i'_t$ represents a network input gate of a $t^{th}$ left eye recursion, $*$ represents multiplication of vectors, $\circ$ represents a convolution operation, $\sigma$ represents a sigmoid function, $W_{xi}$, $W_{hi}$, $W_{ci}$, and $b_i$ represent model parameters of the network input gate, $X'_t$ represents the $t^{th}$ left eye matching similarity and the $(t-1)^{th}$ left eye attention map, $f'_t$ represents a forget gate of the $t^{th}$ left eye recursion, $W_{xf}$, $W_{hf}$, $W_{cf}$, and $b_f$ represent model parameters of the forget gate, $o'_t$ represents an output gate of the $t^{th}$ left eye recursion, $W_{xo}$, $W_{ho}$, $W_{co}$, and $b_o$ represent model parameters of the output gate, $C'_t$ represents a memory cell of the $t^{th}$ left eye recursion, $C'_{t-1}$ represents a memory cell of a $(t-1)^{th}$ left eye recursion, tan h represents a hyperbolic tangent function, $H'_{t-1}$ represents a $(t-1)^{th}$ left eye hidden variable, and $H'_t$ represents the $t^{th}$ left eye hidden variable.

The obtaining a $t^{th}$ right eye hidden variable through calculation according to the $t^{th}$ right eye matching similarity and the $(t-1)^{th}$ right eye attention map by using the ConvLSTM network may include calculating the $t^{th}$ right eye hidden variable in the following manner:

$$i''_t = \sigma(W_{xi}*X''_t + W_{hi}*H''_{t-1} + W_{ci} \circ C''_{t-1} + b_i),$$

$$f''_t = \sigma(W_{xf}*X''_t + W_{hf}*H''_{t-1} + W_{cf} \circ C''_{t-1} + b_f),$$

$$o''_t = \sigma(W_{xo}*X''_t + W_{ho}*H''_{t-1} + W_{co} \circ C''_{t-1} + b_o),$$

$$C''_t = f''_t \circ C''_{t-1} + i'_t \circ \tanh(W_{xc}*X''_t + W_{hc}*H''_{t-1} + b_c), \text{ and}$$

$$H''_t = o''_t \circ \tanh(C''_t), \text{ where}$$

$i''_t$ represents a network input gate of a $t^{th}$ right eye recursion, $X''_t$ represents the $t^{th}$ right eye matching similarity and the $(t-1)^{th}$ right eye attention map, $f''_t$ represents a forget gate of the $t^{th}$ right eye recursion, $o''_t$ represents an output gate of the $t^{th}$ right eye recursion, $C''_t$ represents a memory cell of the $t^{th}$ right eye recursion, $C''_{t-1}$ represents a memory cell of a $(t-1)^{th}$ right eye recursion, $H''_{t-1}$ represents a $(t-1)^{th}$ right eye hidden variable, and $H''_t$ represents the $t^{th}$ right eye hidden variable.

In an embodiment, calculation of hidden variables of the two eyes are specifically described with reference to formulas, and the ConvLSTM network obtains information by using an input gate, a forget gate, and an output gate.

The first step in the ConvLSTM network is to decide information that is to be discarded. This decision is completed by using a forget gate. The gate reads $H'_{t-1}$ (or $H''_{t-1}$) and $X'_t$ (or $X''$), and outputs a value from 0 to 1 to each number in a cell state $C'_{t-1}$ (or $c''_{t-1}$). 1 represents "all retained", and 0 represents "all discarded". $H'_{t-1}$ (or $H''_{t-1}$) represents an output of a previous cell, $X'_t$ (or $X''$) represents an input of a current cell, and σ represents a sigmod function.

The next step is to decide a quantity of pieces of new information added to the cell state. Two substeps are needed to implement this step. First, a sigmoid layer called "input gate layer" decides information that needs to be updated, and a tan h layer generates a vector, that is, candidate content for update. Next, the two portions are combined, to update the cell state. $C'_{t-t}$ (or $c''_{t-1}$) is updated to $C'_t$ (or $c''_t$). The old state is multiplied by $f_t$ (or $f''_t$), and information that is determined to be discarded is discarded.

Finally, a value that is to be outputted needs to be determined. This output is determined based on the cell state, and is a version after filtering. First, a sigmoid layer is run to determine which portion of the cell state is to be outputted. Then, the cell state is processed by using tan h (to obtain a value from −1 to 1), and the value is multiplied by an output of the sigmoid gate. Finally, only the portion that is determined to be outputted is outputted.

Further, in an embodiment of this application, a specific manner of calculating the $t^{th}$ left eye hidden variable and the $t^{th}$ right eye hidden variable is described. The hidden variables of the two eyes may be obtained by using a calculation relationship provided by the ConvLSTM network. In this way, reliability of hidden variable calculation can be effectively improved, and an operable basis for implementing the solution is provided.

Optionally, based on the third embodiment corresponding to FIG. 2, a fifth optional embodiment of the depth information determining method provided in the embodiments of this application, the obtaining a $t^{th}$ left eye disparity cost according to the $t^{th}$ left eye hidden variable may include processing the $t^{th}$ left eye hidden variable by using at least two fully connected layers, to obtain the $t^{th}$ left eye disparity cost. The obtaining a $t^{th}$ right eye disparity cost according to the $t^{th}$ right eye hidden variable may include processing the $t^{th}$ right eye hidden variable by using the at least two fully connected layers, to obtain the $t^{th}$ right eye disparity cost.

In an embodiment, the $t^{th}$ left eye hidden variable may be inputted to the at least two fully connected layers, and the at least two fully connected layers outputs the $t^{th}$ left eye disparity cost. Similarly, the $t^{th}$ right eye hidden variable is inputted to the at least two fully connected layers, and the at least two fully connected layers outputs the $t^{th}$ right eye disparity cost.

Specifically, each node of a fully connected layer is connected to all nodes of a previous layer, to combine features that are previously extracted. Due to a full-connection characteristic of the fully connected layer, the fully connected layer generally has the most parameters. In a forward calculation process, that is, a linear process of weighted summation, each output of the fully connected layer may be obtained by multiplying each node of a previous layer by a weight coefficient W and then adding a bias value b. Assuming that there are 50*4*4 input neuron nodes and 500 output nodes, 50*4*4*500=400000 weight coefficients W and 500 bias parameters b are needed in total.

A connected layer is actually a convolution operation in which a size of a convolution kernel is a size of a previous layer feature. A result obtained after convolution is a node, and the node corresponds to a point in the fully connected layer. Assuming that an output size of the last convolutional layer is 7*7*512, a size of a fully connected layer connected to the convolutional layer is 1*1*4096. If the fully connected layer is converted into a convolutional layer, there are 4096 filters in total. Each filter includes 512 convolution kernels. A size of each convolution kernel is 7*7, and an output size is 1*1*4096. If a fully connected layer of 1*1*4096 is added behind, parameters of a converted convolutional layer corresponding to the fully connected layer are: there are 4096 filters, each filter includes 4096 convolution kernels, a size of each convolution kernel is 1*1, and an output size is 1*1*4096. That is, features are combined to perform calculation of 4096 classification scores, and an obtained correct category has the highest score.

Further, in an embodiment of this application, a method for obtaining the disparity costs of the two eyes may be inputting the hidden variables of the two eyes to at least two fully connected layers, so that the two fully connected layers output the disparity costs of the two eyes. In this way, the disparity costs of the two eyes may be obtained by using fully connected layers, thereby improving feasibility and operability of the solution.

Optionally, based on the third embodiment corresponding to FIG. 2, in a sixth optional embodiment of the depth information determining method provided in the embodiments of this application, the calculating a $t^{th}$ predicted left eye disparity value according to the $t^{th}$ left eye disparity cost may include calculating the $t^{th}$ predicted left eye disparity value in the following manner:

$$d'^* = \Sigma_{d=1}^{Dmax} d'^* \sigma(-c'_d), \text{ where}$$

d'* represents the $t^{th}$ predicted left eye disparity value, $D_{max}$ represents a maximum quantity in different disparity maps, d' represents a $t^{th}$ left eye disparity value, σ represents a sigmoid function, and $c'_d$ represents the $t^{th}$ left eye disparity cost.

The calculating a $t^{th}$ predicted right eye disparity value according to the $t^{th}$ right eye disparity cost includes calculating the $t^{th}$ predicted right eye disparity value in the following manner:

$$d''^* = \Sigma_{d=1}^{Dmax} d''^* \sigma(-c''_d), \text{ where}$$

d''* represents the $t^{th}$ predicted right eye disparity value, $c''_d$ represents the $t^{th}$ right eye disparity cost, and d'' represents a $t^{th}$ right eye disparity value.

In an embodiment, the disparity costs $H*W*D_{max}$ of the two eyes are obtained by using a convolutional layer. A tensor form of the disparity costs of the two eyes is used, and softmax standardization is applied to tensors, so that probability tensors reflect feasible difference probabilities of all pixels. Finally, a differential argmin layer may be used to generate predicted disparity values for all differences on which probability weighting of the differential argmin layer is performed. In mathematics, the foregoing formulas describe how to obtain the predicted disparity values d'* and d''* of the two eyes for given feasible disparity costs $c'_d$ and $c''_d$ by using cost tensors of specific pixels.

Further, in this embodiment of this application, a specific manner of calculating predicted disparity values of two eyes is provided. That is, the predicted disparity values of the two eyes may be calculated by using a maximum quantity in different disparity maps and a left eye disparity value. In this way, a specific basis for implementing the solution is provided, thereby improving practicability and operability of the solution.

Optionally, based on any one of the fourth embodiment to the sixth embodiment corresponding to FIG. 2, in a seventh optional embodiment of the depth information determining method provided in the embodiments of this application, the determining first depth information according to the $t^{th}$ left eye disparity map may include: calculating the first depth information in the following manner:

$$Z' = \frac{Bf}{d'^*},$$

where
Z' represents the first depth information, $d'^*$ represents the $t^{th}$ predicted left eye disparity value, B represents a binocular camera spacing, and f represents a focal length.

The determining second depth information according to the $t^{th}$ right eye disparity map may include calculating the second depth information in the following manner:

$$Z'' = \frac{Bf}{d''^*},$$

where
Z'' represents the second depth information, and d'' represents the $t^{th}$ predicted right eye disparity value.

In this embodiment, after the disparity maps of the two eyes are obtained, depth information of the two eyes may be respectively calculated by using the disparity maps of the two eyes. Using calculation of first depth information of a left view as an example, a spacing and a focal length of a binocular camera need to be obtained, and then, a multiplication result of the spacing and the focal length of the binocular camera is divided by an obtained predicted left eye disparity value, so that the first depth information of the left view may be obtained.

The following describes a deriving manner of the foregoing formula. It is assumed that internal parameters, such as a focal length and a lens, of two cameras are the same. For convenience of math description, coordinates need to be introduced. The coordinates are artificially introduced, so that an object in the real world may be located in different coordinate systems. It is assumed that X axis directions of the two cameras are the same, and image planes overlap. A coordinate system is subject to a left camera, and a right camera is simply translated relative to the left camera, representing by using coordinates ($T_x$, 0, 0). $T_x$ is generally referred to as a base line. Projection coordinates, respectively on left and right image planes, of a point P(X, Y, Z) in the space are easily obtained according to a triangular similarity relationship. Therefore, a calculation manner of a disparity can be obtained as follows:

$$d = x1 - x2 = f\frac{X}{Z} - \left(f\frac{X}{Z} - f\frac{Tx}{Z}\right), \text{ and}$$

-continued $$d = \frac{Bf}{Z}.$$

The following is obtained through deriving:

$$\Rightarrow Z = \frac{Bf}{d}.$$

The depth information is inversely proportional to the disparity, which is consistent with an experience result obtained by using a finger. Therefore, a near object is seen to move faster than a far object.

Further, in an embodiment of this application, a manner of calculating depth information is described, and depth information of two eyes may be predicted by using predicted disparity values obtained through prediction and a spacing and a focal length of a binocular camera. In this way, left eye depth information and right eye depth information may be simultaneously obtained through calculation, and needed depth information may be selected according to an actual requirement, thereby improving practicability and operability of the solution.

Figure 7:
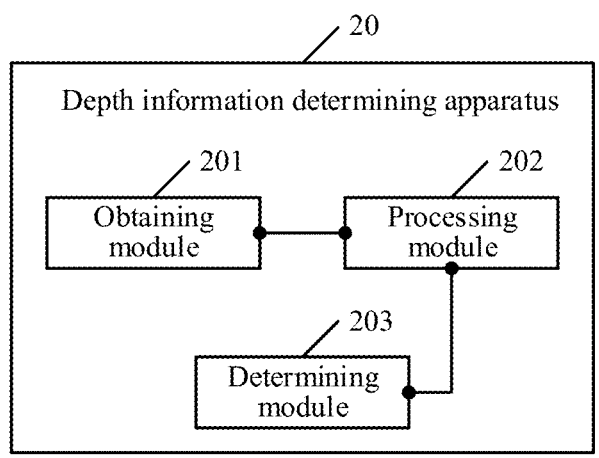
FIG. 7 is a schematic diagram of a depth information determining apparatus according to an embodiment of this application.

The following describes the depth information determining apparatus in this application in detail. FIG. 7 is a schematic diagram of an embodiment of a depth information determining apparatus equipped with a binocular camera according to an embodiment of this application. The depth information determining apparatus 20 includes an obtaining module 201, a processing module 202, and a determining module 203. One or more of the modules can be implemented by processing circuitry, for example.

The obtaining module 201 is configured to obtain a $t^{th}$ left eye matching similarity from a left eye image to a right eye image, and a $t^{th}$ right eye matching similarity from the right eye image to the left eye image, t being an integer greater than 1.

The processing module 202 is configured to process the $t^{th}$ left eye matching similarity obtained by the obtaining module 201 and a $(t-1)^{th}$ left eye attention map by using a neural network model, to obtain a $t^{th}$ left eye disparity map.

The processing module 202 is further configured to process the $t^{th}$ right eye matching similarity obtained by the obtaining module 201 and a $(t-1)^{th}$ right eye attention map by using the neural network model, to obtain a $t^{th}$ right eye disparity map.

The determining module 203 is configured to determine first depth information according to the $t^{th}$ left eye disparity map obtained by the processing module 202 through processing, and determine second depth information according to the $t^{th}$ right eye disparity map obtained by the processing module 202 through processing.

In an embodiment, the obtaining module 201 obtains a $t^{th}$ left eye matching similarity from a left eye image to a right eye image, and a $t^{th}$ right eye matching similarity from the right eye image to the left eye image, t being an integer greater than 1. The processing module 202 processes the $t^{th}$ left eye matching similarity obtained by the obtaining module 201 and a $(t-1)^{th}$ left eye attention map by using a neural network model, to obtain a $t^{th}$ left eye disparity map, and the processing module 202 processes the $t^{th}$ right eye matching similarity obtained by the obtaining module 201 and a $(t-1)^{th}$ right eye attention map by using the neural network model, to obtain a $t^{th}$ right eye disparity map. The determining module 203 determines first depth information according to the $t^{th}$ left eye disparity map obtained by the processing module 202 through processing, and determines second depth information according to the $t^{th}$ right eye disparity map obtained by the processing module 202 through processing.

In an embodiment of this application, a depth information determining apparatus is provided. Disparity maps of two eyes may be obtained by using a neural network model and attention maps of the two eyes obtained through previous learning, and then current attention maps of the two eyes obtained through learning according to the current disparity maps of the two eyes are used for next disparity maps of the two eyes. Through such recursive learning, the disparity maps of the two eyes may be continuously corrected by fully using complementary information of the two eyes, which effectively reduces an error of depth information for a region difficult to match between the two eyes.

Figure 8:
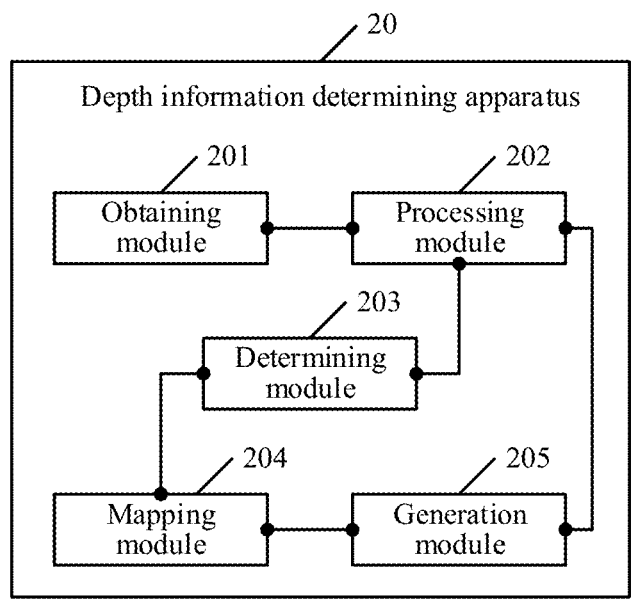
FIG. 8 is a schematic diagram of a depth information determining apparatus according to an embodiment of this application.

Optionally, based on the embodiment corresponding to FIG. 7, referring to FIG. 8, in an embodiment of the depth information determining apparatus 20 provided in the embodiments of this application, the depth information determining apparatus 20 further includes a mapping module 204 and a generation module 205. One or more of the modules can be implemented by processing circuitry, for example.

The mapping module 204 is configured to map the $t^{th}$ right eye disparity map to a left eye coordinate system, to obtain a $t^{th}$ left eye mapping disparity map.

The generation module 205 is configured to generate a $t^{th}$ left eye attention map according to the $t^{th}$ left eye mapping disparity map obtained by the mapping module 204 through mapping and the $t^{th}$ left eye disparity map.

The mapping module 204 is further configured to map the $t^{th}$ left eye disparity map to a right eye coordinate system, to obtain a $t^{th}$ right eye mapping disparity map.

The generation module 205 is further configured to generate a $t^{th}$ right eye attention map according to the $t^{th}$ right eye mapping disparity map obtained by the mapping module 204 through mapping and the $t^{th}$ right eye disparity map.

In addition, in an embodiment of this application, the depth information determining apparatus maps the $t^{th}$ right eye disparity map to a left eye coordinate system, to obtain a $t^{th}$ left eye mapping disparity map, and generates a $t^{th}$ left eye attention map according to the $t^{th}$ left eye mapping disparity map and the $t^{th}$ left eye disparity map. Similarly, a $t^{th}$ right eye attention map may also be obtained. In this way, a current attention map obtained through recursive learning can be used for a next recursive disparity prediction, and a network can purposely correct and update a disparity value of a pixel in a low-confidence region automatically detected by the current recursion according to this, thereby improving reliability of the attention maps of the two eyes.

Optionally, based on the embodiment corresponding to FIG. 8, in an embodiment of the depth information determining apparatus 20 provided in the embodiments of this application, the obtaining module 201 is further configured to obtain a $(t+1)^{th}$ left eye matching similarity from the left eye image to the right eye image, and a $(t+1)^{th}$ right eye matching similarity from the right eye image to the left eye image after the determining module 203 determines the first depth information according to the $t^{th}$ left eye disparity map, and determines the second depth information according to the $t^{th}$ right eye disparity map. The processing module 202 is further configured to process the $(t+1)^{th}$ left eye matching similarity and the $t^{th}$ left eye attention map by using the neural network model, to obtain a $(t+1)^{th}$ left eye disparity map. The processing module 202 is further configured to process the $(t+1)^{th}$ right eye matching similarity and the $t^{th}$ right eye attention map by using the neural network model, to obtain a $(t+1)^{th}$ right eye disparity map. The determining module 203 is further configured to determine third depth information according to the $(t+1)^{th}$ left eye disparity map obtained by the processing module 202 through processing, and determine fourth depth information according to the $(t+1)^{th}$ right eye disparity map obtained by the processing module 202 through processing.

Further, in an embodiment of this application, after obtaining current depth information of the two eyes, the depth information determining apparatus may further continue to obtain next depth information of the two eyes. In this way, for comparison between the left and right eyes, a convolutional layer and an aggregation layer may be added to the neural network models, so as to generate attention maps of the two eyes. The attention maps of the two eyes each are used as an input of a next step, and an LRCR model is started. Left-right mismatching regions may be focused more in the next step, thereby improving prediction accuracy.

Optionally, based on the embodiment corresponding to FIG. 7 or FIG. 8, in an embodiment of the depth information determining apparatus 20 provided in the embodiments of this application, the processing module 202 is specifically configured to obtain a $t^{th}$ left eye hidden variable through calculation according to the $t^{th}$ left eye matching similarity and the $(t-1)^{th}$ left eye attention map by using a ConvLSTM network; obtain a $t^{th}$ left eye disparity cost according to the $t^{th}$ left eye hidden variable; and calculate a $t^{th}$ predicted left eye disparity value according to the $t^{th}$ left eye disparity cost, the $t^{th}$ predicted left eye disparity value being used for generating the $t^{th}$ left eye disparity map.

The processing module 202 is specifically configured to obtain a $t^{th}$ right eye hidden variable through calculation according to the $t^{th}$ right eye matching similarity and the $(t-1)^{th}$ right eye attention map by using the ConvLSTM network; obtain a $t^{th}$ right eye disparity cost according to the $t^{th}$ right eye hidden variable; and calculate a $t^{th}$ predicted right eye disparity value according to the $t^{th}$ right eye disparity cost, the $t^{th}$ predicted right eye disparity value being used for generating the $t^{th}$ right eye disparity map.

Further, in an embodiment of this application, the ConvLSTM network is used to process the $t^{th}$ left eye matching similarity and the $(t-1)^{th}$ left eye attention map, to obtain the $t^{th}$ left eye disparity map, and process the $t^{th}$ right eye matching similarity and the $(t-1)^{th}$ right eye attention map, to obtain the $t^{th}$ right eye disparity map. In this way, based on predicted matching similarities of the two eyes, recursive prediction is performed on the disparity maps of the two eyes by using the ConvLSTM network. The ConvLSTM network has strong capabilities of sequence modeling and information processing as a related recursive neural network, and also can effectively extract information in each pixel space neighborhood, so as to integrate spatial context information.

Optionally, based on the embodiment corresponding to FIG. 7 or FIG. 8, in an embodiment of the depth information determining apparatus 20 provided in the embodiments of this application, the processing module 202 is specifically configured to calculate the $t^{th}$ left eye hidden variable in the following manner:

$$i'_t = \sigma(W_{xi}*X'_t + W_{hi}*H'_{t-1} + W_{ci} \circ C'_{t-1} \pm b_i),$$

$$f'_t = \sigma(W_{xf}*X'_t + W_{hf}*H'_{t-1} + W_{cf} \circ C'_{t-1} + b_f),$$

$$o'_t = \sigma(W_{xo}*X'_t + W_{ho}*H'_{t-1} + W_{co} \circ C'_{t-1} \pm b_o),$$

$$C'_t = f'_t \circ C'_{t-1} + t'_t \circ \tanh(W_{xc}*X'_t + W_{hc}*H'_{t-1} \pm b_c), \text{ and}$$

$$H'_t = o'_t \circ \tanh(C'_t); \text{ and}$$

$i'_t$ represents a network input gate of a $t^{th}$ left eye recursion, * represents multiplication of vectors, ° represents a convolution operation, σ represents a sigmoid function, $W_{xi}$, $W_{hi}$, $W_{ci}$, and $b_i$ represent model parameters of the network input gate, $X'_t$ represents the $t^{th}$ left eye matching similarity and the $(t-1)^{th}$ left eye attention map, $f_t$ represents a forget gate of the $t^{th}$ left eye recursion, $W_{xf}$, $W_{hf}$, $W_{cf}$, and $b_f$ represent model parameters of the forget gate, $o'_t$ represents an output gate of the $t^{th}$ left eye recursion, $W_{xo}$, $W_{ho}$, $W_{co}$, and $b_o$ represent model parameters of the output gate, $C'_t$ represents a memory cell of the $t^{th}$ left eye recursion, $C'_{t-1}$ represents a memory cell of a $(t-1)^{th}$ left eye recursion, tan h represents a hyperbolic tangent function, $H'_{t-1}$ represents a $(t-1)^{th}$ left eye hidden variable, and $H'_t$ represents the $t^{th}$ left eye hidden variable.

The processing module 202 is specifically configured to calculate the $t^{th}$ right eye hidden variable in the following manner:

$$i''_t = \sigma(W_{xi}*X''_t + W_{hi}*H''_{t-1} + W_{ci} \circ C''_{t-1} + b_i),$$

$$f''_t = \sigma(W_{xf}*X''_t + W_{hf}*H''_{t-1} + W_{cf} \circ C''_{t-1} + b_f),$$

$$o''_t = \sigma(W_{xo}*X''_t + W_{ho}*H''_{t-1} + W_{co} \circ C''_{t-1} \pm b_o),$$

$$C''_t = f''_t \circ C''_{t-1} + t''_t \circ \tanh(W_{xc}*X''_t + W_{hc}*H''_{t-1} \pm b_c), \text{ and}$$

$$H''_t = o''_t \circ \tanh(C''_t), \text{ where}$$

$i''_t$ represents a network input gate of a $t^{th}$ right eye recursion, $X''_t$ represents the $t^{th}$ right eye matching similarity and the $(t-1)^{th}$ right eye attention map, $f''_t$ represents a forget gate of the $t^{th}$ right eye recursion, $o''_t$ represents an output gate of the $t^{th}$ right eye recursion, $c''_t$ represents a memory cell of the $t^{th}$ right eye recursion, $c''_{t-1}$ represents a memory cell of a $(t-1)^{th}$ right eye recursion, $H''_{t-1}$ represents a $(t-1)^{th}$ right eye hidden variable, and $H''_t$ represents the $t^{th}$ right eye hidden variable.

Further, in an embodiment of this application, a specific manner of calculating the $t^{th}$ left eye hidden variable and the $t^{th}$ right eye hidden variable is described. The hidden variables of the two eyes may be obtained by using a calculation relationship provided by the ConvLSTM network. In this way, reliability of hidden variable calculation can be effectively improved, and an operable basis for implementing the solution is provided.

Optionally, based on the embodiment corresponding to FIG. 7 or FIG. 8, in an embodiment of the depth information determining apparatus 20 provided in the embodiments of this application, the processing module 202 is specifically configured to process the $t^{th}$ left eye hidden variable by using at least two fully connected layers, to obtain the $t^{th}$ left eye disparity cost. Further, the processing module 202 is specifically configured to process the $t^{th}$ right eye hidden variable by using the at least two fully connected layers, to obtain the $t^{th}$ right eye disparity cost.

Further, in an embodiment of this application, a method for obtaining the disparity costs of the two eyes may be inputting hidden variables of the two eyes to at least two fully connected layers, so that the two fully connected layers output the disparity costs of the two eyes. In this way, the disparity costs of the two eyes may be obtained by using fully connected layers, thereby improving feasibility and operability of the solution.

Optionally, based on the embodiment corresponding to FIG. 7 or FIG. 8, in an embodiment of the depth information determining apparatus 20 provided in the embodiments of this application, the processing module 202 is specifically configured to calculate the $t^{th}$ predicted left eye disparity value in the following manner:

$$d'* = \Sigma_{d=1}^{Dmax} d'* \sigma(-c'_d), \text{ where}$$

d'* represents the $t^{th}$ predicted left eye disparity value, D represents a maximum quantity in different disparity maps, d' represents a $t^{th}$ left eye disparity value, a represents a sigmoid function, and $c'_d$ represents the $t^{th}$ left eye disparity cost.

The processing module 202 is specifically configured to calculate the $t^{th}$ predicted right eye disparity value in the following manner:

$$d''* = \Sigma_{d=1}^{Dmax} * \sigma(-c''_d), \text{ where}$$

d'' represents the $t^{th}$ predicted right eye disparity value, $c''_d$ represents the $t^{th}$ right eye disparity cost, and d'' represents a $t^{th}$ right eye disparity value.

Further, in an embodiment of this application, a specific manner of calculating predicted disparity values of two eyes is provided. That is, the predicted disparity values of the two eyes may be calculated by using a maximum quantity in different disparity maps and a left eye disparity value. In this way, a specific basis for implementing the solution is provided, thereby improving practicability and operability of the solution.

Optionally, based on the embodiment corresponding to FIG. 7 or FIG. 8, in an embodiment of the depth information determining apparatus 20 provided in the embodiments of this application, the determining module 203 is specifically configured to calculate the first depth information in the following manner:

$$Z' = \frac{Bf}{d'*},$$

where

Z' represents the first depth information, d'* represents the $t^{th}$ predicted left eye disparity value, B represents a binocular camera spacing, and f represents a focal length.

The determining module 203 is specifically configured to calculate the second depth information in the following manner:

$$Z'' = \frac{Bf}{d''*},$$

where

Z'' represents the second depth information, and d'' represents the $t^{th}$ predicted right eye disparity value.

Further, in an embodiment of this application, a manner of calculating depth information is described, and depth information of two eyes may be predicted by using predicted disparity values obtained through prediction and a spacing and a focal length of a binocular camera. In this way, left eye depth information and right eye depth information may be simultaneously obtained through calculation, and needed depth information may be selected according to an actual requirement, thereby improving practicability and operability of the solution.

Figure 9:
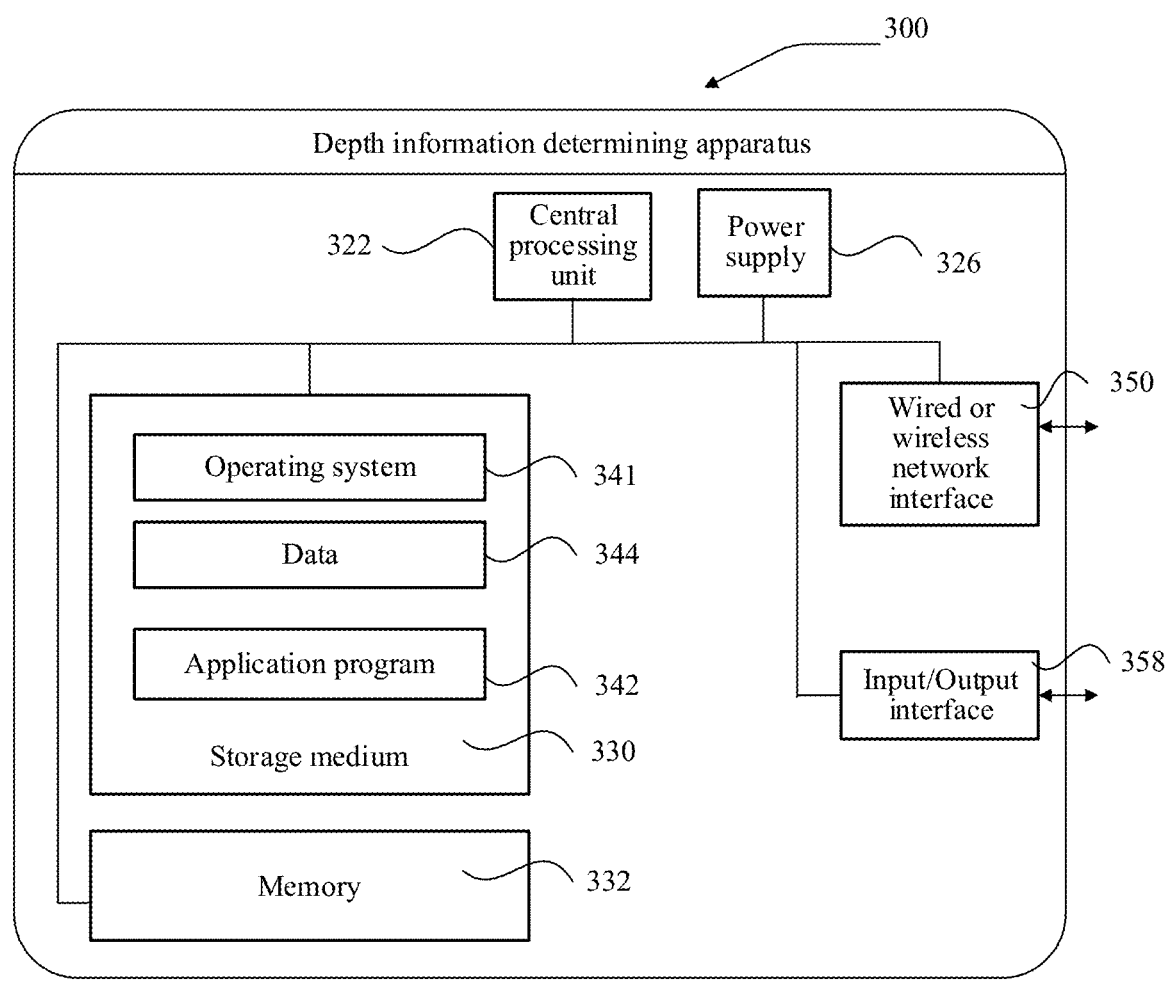
FIG. 9 is a schematic structural diagram of a depth information determining apparatus according to an embodiment of this application.

FIG. 9 is a schematic structural diagram of a depth information determining apparatus according to an embodiment of this application. The depth information determining apparatus 300 may vary greatly due to different configurations or performance, and may include one or more central processing units (CPUs) 322 (e.g., processing circuitry such as one or more processors), a memory 332, and one or more storage media 330 (e.g., one or more mass storage devices) that store an application program 342 or data 344. The memory 332 and the storage medium 330 may be transient storages or persistent storages. The program stored in the storage medium 330 (e.g., a non-transitory computer-readable storage medium) may include one or more modules (not shown in the figure), and each module may include a series of instructions and operations for the depth information determining apparatus. Still further, the CPU 322 may be configured to communicate with the storage medium 330, and perform, on the depth information determining apparatus 300, the series of instructions and operations in the storage medium 330.

The depth information determining apparatus 300 may further include one or more power supplies 326, one or more wired or wireless network interfaces 350, one or more input/output interfaces 358, and/or one or more operating systems 341, for example, Windows Server™, Mac OS XTM, Unix™, Linux™, or FreeBSD™.

Steps performed by the depth information determining apparatus in the foregoing embodiment may be based on the structure of the depth information determining apparatus shown in FIG. 9.

The CPU 322 is configured to obtain a $t^{th}$ left eye matching similarity from a left eye image to a right eye image, and a $t^{th}$ right eye matching similarity from the right eye image to the left eye image, t being an integer greater than 1. The CPU 322 is configured to process the $t^{th}$ left eye matching similarity and a $(t-1)^{th}$ left eye attention map by using a neural network model, to obtain a $t^{th}$ left eye disparity map. The CPU 322 is configured to process the $t^{th}$ right eye matching similarity and a $(t-1)^{th}$ right eye attention map by using the neural network model, to obtain a $t^{th}$ right eye disparity map. Further the CPU 322 is configured to determine first depth information according to the $t^{th}$ left eye disparity map, and determine second depth information according to the $t^{th}$ right eye disparity map.

Optionally, the CPU 322 is further configured to map the $t^{th}$ right eye disparity map to a left eye coordinate system, to obtain a $t^{th}$ left eye mapping disparity map. The CPU 322 is configured to generate a $t^{th}$ left eye attention map according to the $t^{th}$ left eye mapping disparity map and the $t^{th}$ left eye disparity map. The CPU 322 is configured to map the $t^{th}$ left eye disparity map to a right eye coordinate system, to obtain a $t^{th}$ right eye mapping disparity map. The CPU 322 is configured to generate a $t^{th}$ right eye attention map according to the $t^{th}$ right eye mapping disparity map and the $t^{th}$ right eye disparity map.

Optionally, the CPU 322 is further configured to obtain a $(t+1)^{th}$ left eye matching similarity from the left eye image to the right eye image, and a $(t+1)^{th}$ right eye matching similarity from the right eye image to the left eye image. Process the $(t+1)^{th}$ left eye matching similarity and the $t^{th}$ left eye attention map by using the neural network model, to obtain a $(t+1)^{th}$ left eye disparity map. Process the $(t+1)^{th}$ right eye matching similarity and the $t^{th}$ right eye attention map by using the neural network model, to obtain a $(t+1)^{th}$ right eye disparity map. Determine third depth information according to the $(t+1)^{th}$ left eye disparity map, and determine fourth depth information according to the $(t+1)^{th}$ right eye disparity map.

Optionally, the CPU 322 is specifically configured to obtain a $t^{th}$ left eye hidden variable through calculation according to the $t^{th}$ left eye matching similarity and the $(t-1)^{th}$ left eye attention map by using a ConvLSTM network. The CPU 322 is configured to obtain a $t^{th}$ left eye disparity cost according to the $t^{th}$ left eye hidden variable. The CPU 322 is configured to calculate a $t^{th}$ predicted left eye disparity value according to the $t^{th}$ left eye disparity cost, the $t^{th}$ predicted left eye disparity value being used for generating the $t^{th}$ left eye disparity map. The CPU 322 is configured to obtain a $t^{th}$ right eye hidden variable through calculation according to the $t^{th}$ right eye matching similarity and the $(t-1)^{th}$ right eye attention map by using the ConvLSTM network. The CPU 322 is configured to obtain a $t^{th}$ right eye disparity cost according to the $t^{th}$ right eye hidden variable. The CPU 322 is configured to calculate a $t^{th}$ predicted right eye disparity value according to the $t^{th}$ right eye disparity cost, the $t^{th}$ predicted right eye disparity value being used for generating the $t^{th}$ right eye disparity map.

Optionally, the CPU 322 is specifically configured to calculate the $t^{th}$ left eye hidden variable in the following manner:

$$i'_t = \sigma(W_{xi} * X'_t + W_{hi} * H'_{t-1} + W_{ci} \circ C'_{t-1} \pm b_i),$$

$$f'_t = \sigma(W_{xf} * X'_t + W_{hf} * H'_{t-1} + W_{cf} \circ C'_{t-1} + b_f),$$

$$o'_t = \sigma(W_{xo} * X'_t + W_{ho} * H'_{t-1} + W_{co} \circ C'_{t-1} \pm b_o),$$

$$C'_t = f'_t \circ C'_{t-1} + i'_t \circ \tanh(W_{xc} * X'_t + W_{hc} * H'_{t-1} \pm b_c), \text{ and}$$

$$H'_t = o'_t \circ \tanh(C'_t), \text{ where}$$

$i'_t$ represents a network input gate of a $t^{th}$ left eye recursion, $*$ represents multiplication of vectors, $\circ$ represents a convolution operation, $\sigma$ represents a sigmoid function, $W_{xi}$, $W_{ci}$, and $b_i$ represent model parameters of the network input gate, $X'_t$ represents the $t^{th}$ left eye matching similarity and the $(t-1)^{th}$ left eye attention map, $f_t$ represents a forget gate of the $t^{th}$ left eye recursion, $W_{xf}$, $W_{hf}$, $W_{cf}$, and $b_f$ represent model parameters of the forget gate, $o'_t$ represents an output gate of the $t^{th}$ left eye recursion, $W_{xo}$, $W_{ho}$, $W_{co}$, and $b_o$ represent model parameters of the output gate, $C'_t$ represents a memory cell of the $t^{th}$ left eye recursion, $C'_{t-1}$ represents a memory cell of a $(t-1)^{th}$ left eye recursion, tan h represents a hyperbolic tangent function, $H'_{t-1}$ represents a $(t-1)^{th}$ left eye hidden variable, and $H'_t$ represents the $t^{th}$ left eye hidden variable.

The CPU 322 is configured to calculate the $t^{th}$ right eye hidden variable in the following manner:

$$i''_t = \sigma(W_{xi} * X''_t + W_{hi} * H''_{t-1} + W_{ci} \circ C''_{t-1} \pm b_i),$$

$$f''_t = \sigma(W_{xf} * X''_t + W_{hf} * H''_{t-1} + W_{cf} \circ C''_{t-1} + b_f),$$

$$o''_t = \sigma(W_{xo} * X''_t + W_{ho} * H''_{t-1} + W_{co} \circ C''_{t-1} \pm b_o),$$

$$C''_t = f''_t \circ C''_{t-1} + i''_t \circ \tanh(W_{xc} * X''_t + W_{hc} * H''_{t-1} \pm b_c), \text{ and}$$

$$H''_t = o''_t \circ \tanh(C''_t), \text{ where}$$

$i''_t$ represents a network input gate of a $t^{th}$ right eye recursion, $X''_t$ represents the $t^{th}$ right eye matching similarity and the $(t-1)^{th}$ right eye attention map, $f_t$ represents a forget gate of the $t^{th}$ right eye recursion, $o''_t$ represents an output gate of the $t^{th}$ right eye recursion, $c''_t$ represents a memory cell of the $t^{th}$ right eye recursion, $c''_{t-1}$ represents a memory cell of a $(t-1)^{th}$ right eye recursion, $H''_{t-1}$ represents a $(t-1)^{th}$ right eye hidden variable, and $H''_t$ represents the $t^{th}$ right eye hidden variable.

Optionally, the CPU 322 is specifically configured to process the $t^{th}$ left eye hidden variable by using at least two fully connected layers, to obtain the $t^{th}$ left eye disparity cost; and process the $t^{th}$ right eye hidden variable by using the at least two fully connected layers, to obtain the $t^{th}$ right eye disparity cost.

Optionally, the CPU 322 is specifically configured to calculate the $t^{th}$ predicted left eye disparity value in the following manner:

$$d'^* = \Sigma_{d=1}^{Dmax} d'^* \sigma(-c''_d), \text{ where}$$

d'* represents the $t^{th}$ predicted left eye disparity value, $D_{max}$ represents a maximum quantity in different disparity maps, d' represents a $t^{th}$ left eye disparity value, σ represents a sigmoid function, and $c'_d$ represents the $t^{th}$ left eye disparity cost.

The CPU 322 is configured to calculate the $t^{th}$ predicted right eye disparity value in the following manner:

$$d''^* = \Sigma_{d=1}^{Dmax} d''^* \sigma(-c''_d), \text{ where}$$

d" represents the $t^{th}$ predicted right eye disparity value, $c''_d$ represents the $t^{th}$ right eye disparity cost, and d" represents a $t^{th}$ right eye disparity value.

Optionally, the CPU 322 is specifically configured to calculate the first depth information in the following manner:

$$Z' = \frac{Bf}{d'^*},$$

where

Z' represents the first depth information, d'* represents the $t^{th}$ predicted left eye disparity value, B represents a binocular camera spacing, and f represents a focal length.

The CPU 322 is configured to calculate the second depth information in the following manner:

$$Z'' = \frac{Bf}{d''^*},$$

where

Z" represents the second depth information, and d" represents the $t^{th}$ predicted right eye disparity value.

A person skilled in the art should understand that, for the purpose of convenience and brief description, for specific work processes of the foregoing described system, apparatus, and unit, reference may be made to corresponding processes in the foregoing method embodiments, and details are not described herein again.

In the embodiments provided in this application, it is to be understood that the disclosed system, apparatus, and method may be implemented in other manners. For example, the described apparatus embodiment is merely an example. For example, the unit division is merely logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electric, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of this application may be integrated into one processing unit, or each of the units may exist alone physically, or two or more units are integrated into one unit. The integrated unit may be implemented in the form of hardware, or may be implemented in the form of software functional unit.

When the integrated unit is implemented in the form of a software functional unit and sold or used as an independent product, the integrated unit may be stored in a computer-readable storage medium. Based on such an understanding, some or all of the technical solutions may be implemented in a form of a software product. The computer software product is stored in a storage medium (e.g., a non-transitory computer-readable storage medium) and includes several instructions for instructing a computer device (e.g., a personal computer, a server, a network device, or the like) to perform all or some steps of the methods described in the embodiments of this application. The foregoing storage medium (or non-transitory computer-readable storage medium) includes: any medium that can store program code, such as a USB flash drive, a removable hard disk, a read-only memory (ROM), a random access memory (RAM), a magnetic disk, or a compact disc.

The foregoing embodiments are merely intended to describe exemplary technical solutions of this application, but not for limiting the scope of this application. Although this application is described in detail with reference to the foregoing embodiments, a person of ordinary skill in the art should understand that they may still make modifications to the technical solutions described in the foregoing embodiments or make equivalent replacements to some technical features thereof, without departing from the spirit and scope of the technical solutions of the embodiments of this application.

What is claimed is:

1. A depth information determining method for dual cameras, the method comprising:
    obtaining, by processing circuitry, a $t^{th}$ left eye matching similarity from a left eye image captured by a first camera of the dual cameras to a right eye image captured by a second camera of the dual cameras, and a $t^{th}$ right eye matching similarity from the right eye image to the left eye image, t being an integer greater than 1;
    processing, by the processing circuitry, the $t^{th}$ left eye matching similarity and a $(t-1)^{th}$ left eye attention map with a neural network model, to obtain a $t^{th}$ left eye disparity map;
    processing, by the processing circuitry, the $t^{th}$ right eye matching similarity and a $(t-1)^{th}$ right eye attention map with the neural network model, to obtain a $t^{th}$ right eye disparity map;
    determining, by the processing circuitry, first depth information according to the $t^{th}$ left eye disparity map; and
    determining, by the processing circuitry, second depth information according to the $t^{th}$ right eye disparity map.

2. The depth information determining method according to claim 1, further comprising:
    mapping the $t^{th}$ right eye disparity map to a left eye coordinate system, to obtain a $t^{th}$ left eye mapping disparity map;

generating a $t^{th}$ left eye attention map according to the $t^{th}$ left eye mapping disparity map and the $t^{th}$ left eye disparity map;

mapping the $t^{th}$ left eye disparity map to a right eye coordinate system, to obtain a $t^{th}$ right eye mapping disparity map; and generating a $t^{th}$ right eye attention map according to the $t^{th}$ right eye mapping disparity map and the $t^{th}$ right eye disparity map.

3. The depth information determining method according to claim 2, wherein after the determining the first depth information and the determining the second depth information, the method further comprises:

obtaining a $(t+1)^{th}$ left eye matching similarity from the left eye image to the right eye image, and a $(t+1)^{th}$ right eye matching similarity from the right eye image to the left eye image;

processing the $(t+1)^{th}$ left eye matching similarity and the $t^{th}$ left eye attention map with the neural network model, to obtain a $(t+1)^{th}$ left eye disparity map;

processing the $(t+1)^{th}$ right eye matching similarity and the $t^{th}$ right eye attention map with the neural network model, to obtain a $(t+1)^{th}$ right eye disparity map;

determining third depth information according to the $(t+1)^{th}$ left eye disparity map; and determining fourth depth information according to the $(t+1)^{th}$ right eye disparity map.

4. The depth information determining method according to claim 1, wherein the processing the $t^{th}$ left eye matching similarity and the $(t-1)^{th}$ left eye attention map includes:

obtaining a $t^{th}$ left eye hidden variable through calculation according to the $t^{th}$ left eye matching similarity and the $(t-1)^{th}$ left eye attention map by using a convolutional long short-term memory (ConvLSTM) network;

obtaining a $t^{th}$ left eye disparity cost according to the $t^{th}$ left eye hidden variable; and calculating a $t^{th}$ predicted left eye disparity value according to the $t^{th}$ left eye disparity cost, the $t^{th}$ predicted left eye disparity value being used for generating the $t^{th}$ left eye disparity map; and the processing the $t^{th}$ right eye matching similarity and the $(t-1)^{th}$ right eye attention map includes:

obtaining a $t^{th}$ right eye hidden variable through calculation according to the $t^{th}$ right eye matching similarity and the $(t-1)^{th}$ right eye attention map by using the ConvLSTM network;

obtaining a $t^{th}$ right eye disparity cost according to the $t^{th}$ right eye hidden variable; and calculating a $t^{th}$ predicted right eye disparity value according to the $t^{th}$ right eye disparity cost, the $t^{th}$ predicted right eye disparity value being used for generating the $t^{th}$ right eye disparity map.

5. The depth information determining method according to claim 4, wherein the obtaining the $t^{th}$ left eye hidden variable includes calculating the $t^{th}$ left eye hidden variable based on $i'_t = \sigma(W_{xi} * X'_t + W_{hi} * H'_{t-1} + W_{ci} \circ C'_{t-1} + b_i),$ $f'_t = \sigma(W_{xf} * X'_t + W_{hf} * H'_{t-1} + W_{cf} \circ C'_{t-1} + b_f),$ $o'_t = \sigma(W_{xo} * X'_t + W_{ho} * H'_{t-1} + W_{co} \circ C'_{t-1} + b_o),$ $C'_t = f'_t \circ C'_{t-1} + i'_t \circ \tanh(W_{xc} * X'_t + W_{hc} * H'_{t-1} + b_c),$ and $H'_t = o'_t \circ \tanh(C'_t);$ $i'_t$ represents a network input gate of a $t^{th}$ left eye recursion, * represents multiplication of vectors, ∘ represents a convolution operation, σ represents a sigmoid function, $W_{xi}$, $W_{hi}$, $W_{ci}$, and $b_i$ represent model parameters of the network input gate, $X'_t$ represents the $t^{th}$ left eye matching similarity and the $(t-1)^{th}$ left eye attention map, $f'_t$ represents a forget gate of the $t^{th}$ left eye recursion, $W_{xf}$, $W_{hf}$, $W_{cf}$, and $b_f$ represent model parameters of the forget gate, $o'_t$ represents an output gate of the $t^{th}$ left eye recursion, $W_{xo}$, $W_{ho}$, $W_{co}$, and $b_o$ represent model parameters of the output gate, $C'_t$ represents a memory cell of the $t^{th}$ left eye recursion, $C'_{t-1}$ represents a memory cell of a $(t-1)^{th}$ left eye recursion, tan h represents a hyperbolic tangent function, $H'_{t-1}$ represents a $(t-1)^{th}$ left eye hidden variable, and $H'_t$ represents the $t^{th}$ left eye hidden variable;

the obtaining a $t^{th}$ right eye hidden variable includes calculating the $t^{th}$ right eye hidden variable based on $i''_t = \sigma(W_{xi} * X''_t + W_{hi} * H''_{t-1} + W_{ci} \circ C''_{t-1} + b_i),$ $f''_t = \sigma(W_{xf} * X''_t + W_{hf} * H''_{t-1} + W_{cf} \circ C''_{t-1} + b_f),$ $o''_t = \sigma(W_{xo} * X''_t + W_{ho} * H''_{t-1} + W_{co} \circ C''_{t-1} + b_o),$ $C''_t = f''_t \circ C''_{t-1} + i''_t \circ \tanh(W_{xc} * X''_t + W_{hc} * H''_{t-1} + b_c),$ and $H''_t = o''_t \circ \tanh(C''_t),$ where $i''_t$ represents a network input gate of a $t^{th}$ right eye recursion, $X''_t$ represents the $t^{th}$ right eye matching similarity and the $(t-1)^{th}$ right eye attention map, $f''_t$ represents a forget gate of the $t^{th}$ right eye recursion, $o''_t$ represents an output gate of the $t^{th}$ right eye recursion, $C''_t$ represents a memory cell of the $t^{th}$ right eye recursion, $C''_{t-1}$ represents a memory cell of a $(t-1)^{th}$ right eye recursion, $H''_{t-1}$ represents a $(t-1)^{th}$ right eye hidden variable, and $H''_t$ represents the $t^{th}$ right eye hidden variable.

6. The depth information determining method according to claim 4, wherein the obtaining the $t^{th}$ left eye disparity cost includes processing the $t^{th}$ left eye hidden variable with at least two fully connected layers, to obtain the $t^{th}$ left eye disparity cost; and the obtaining the $t^{th}$ right eye disparity cost includes processing the $t^{th}$ right eye hidden variable with the at least two fully connected layers, to obtain the $t^{th}$ right eye disparity cost.

7. The depth information determining method according to claim 4, wherein the calculating the $t^{th}$ predicted left eye disparity value according to the $t^{th}$ left eye disparity cost includes calculating the $t^{th}$ predicted left eye disparity value based on $d'* = \Sigma_{d=1}^{Dmax} d' * \sigma(-c'_d);$ $d'*$ represents the $t^{th}$ predicted left eye disparity value, $D_{max}$ represents a maximum quantity in different disparity maps, $d'$ represents a $t^{th}$ left eye disparity value, σ represents a sigmoid function, and $c'_d$ represents the $t^{th}$ left eye disparity cost;

the calculating the $t^{th}$ predicted right eye disparity value includes calculating the $t^{th}$ predicted right eye disparity value based on $d''* = \Sigma_{d=1}^{Dmax} d'' * \sigma(-c''_d);$ and $d''*$ represents the $t^{th}$ predicted right eye disparity value, $c''_d$ represents the $t^{th}$ right eye disparity cost, and $d''$ represents a $t^{th}$ right eye disparity value.

8. The depth information determining method according to claim 5, wherein the determining the first depth information includes calculating the first depth information based on $$Z' = \frac{Bf}{d'^*};$$

Z' represents the first depth information, d'* represents the $t^{th}$ predicted left eye disparity value, B represents a binocular camera spacing, and f represents a focal length;

the determining the second depth information includes calculating the second depth information based on $$Z'' = \frac{Bf}{d''^*};$$

and

Z" represents the second depth information, and d" represents the $t^{th}$ predicted right eye disparity value.

9. A depth information determining apparatus, comprising:
processing circuitry configured to
obtain a $t^{th}$ left eye matching similarity from a left eye image captured by a first camera of dual cameras to a right eye image captured by a second camera of the dual cameras, and a $t^{th}$ right eye matching similarity from the right eye image to the left eye image, t being an integer greater than 1;
process the $t^{th}$ left eye matching similarity and a $(t-1)^{th}$ left eye attention map with a neural network model, to obtain a $t^{th}$ left eye disparity map;
process the $t^{th}$ right eye matching similarity and a $(t-1)^{th}$ right eye attention map with the neural network model, to obtain a $t^{th}$ right eye disparity map;
determine first depth information according to the $t^{th}$ left eye disparity map; and
determine second depth information according to the $t^{th}$ right eye disparity map.

10. The depth information determining apparatus according to claim 9, wherein processing circuitry is configured to
map the $t^{th}$ right eye disparity map to a left eye coordinate system, to obtain a $t^{th}$ left eye mapping disparity map;
generate a $t^{th}$ left eye attention map according to the $t^{th}$ left eye mapping disparity map and the $t^{th}$ left eye disparity map;
map the $t^{th}$ left eye disparity map to a right eye coordinate system, to obtain a $t^{th}$ right eye mapping disparity map; and
generate a $t^{th}$ right eye attention map according to the $t^{th}$ right eye mapping disparity map and the $t^{th}$ right eye disparity map.

11. The depth information determining apparatus according to claim 10, wherein the processing circuitry is configured to
obtain a $(t+1)^{th}$ left eye matching similarity from the left eye image to the right eye image, and a $(t+1)^{th}$ right eye matching similarity from the right eye image to the left eye image;
process the $(t+1)^{th}$ left eye matching similarity and the $t^{th}$ left eye attention map with the neural network model, to obtain a $(t+1)^{th}$ left eye disparity map;
process the $(t+1)^{th}$ right eye matching similarity and the $t^{th}$ right eye attention map with the neural network model, to obtain a $(t+1)^{th}$ right eye disparity map;
determine third depth information according to the $(t+1)^{th}$ left eye disparity map; and
determine fourth depth information according to the $(t+1)^{th}$ right eye disparity map.

12. The depth information determining apparatus according to claim 9, wherein the processing circuitry is configured to
obtain a $t^{th}$ left eye hidden variable through calculation according to the $t^{th}$ left eye matching similarity and the $(t-1)^{th}$ left eye attention map by using a convolutional long short-term memory (ConvLSTM) network;
obtain a $t^{th}$ left eye disparity cost according to the $t^{th}$ left eye hidden variable;
calculate a $t^{th}$ predicted left eye disparity value according to the $t^{th}$ left eye disparity cost, the $t^{th}$ predicted left eye disparity value being used for generating the $t^{th}$ left eye disparity map;
obtain a $t^{th}$ right eye hidden variable through calculation according to the $t^{th}$ right eye matching similarity and the $(t-1)^{th}$ right eye attention map by using the ConvLSTM network;
obtain a $t^{th}$ right eye disparity cost according to the $t^{th}$ right eye hidden variable; and
calculate a $t^{th}$ predicted right eye disparity value according to the $t^{th}$ right eye disparity cost, the $t^{th}$ predicted right eye disparity value being used for generating the $t^{th}$ right eye disparity map.

13. The depth information determining apparatus according to claim 12, wherein
the processing circuitry is configured to calculate the $t^{th}$ left eye hidden variable based on $$i'_t = \sigma(W_{xi}*X'_t + W_{hi}*H'_{t-1} + W_{ci} \circ C'_{t-1} \pm b_i),$$

$$f'_t = \sigma(W_{xf}*X'_t + W_{hf}*H'_{t-1} + W_{cf} \circ C'_{t-1} + b_f),$$

$$o'_t = \sigma(W_{xo}*X'_t + W_{ho}*H'_{t-1} + W_{co} \circ C'_{t-1} \pm b_o),$$

$$C'_t = f'_t \circ C'_{t-1} + i'_t \circ \tanh(W_{xc}*X'_t + W_{hc}*H'_{t-1} \pm b_c), \text{ and}$$

$$H'_t = o'_t \circ \tanh(C'_t);$$

$i'_t$ represents a network input gate of a $t^{th}$ left eye recursion, * represents multiplication of vectors, ° represents a convolution operation, σ represents a sigmoid function, $W_{xi}$, $W_{hi}$, $W_{ci}$, and $b_i$ represent model parameters of the network input gate, $X'_t$ represents the $t^{th}$ left eye matching similarity and the $(t-1)^{th}$ left eye attention map, $f'_t$ represents a forget gate of the $t^{th}$ left eye recursion, $W_{xf}$, $W_{hf}$, $W_{cf}$, and $b_f$ represent model parameters of the forget gate, $o'_t$ represents an output gate of the $t^{th}$ left eye recursion, $W_{xo}$, $W_{ho}$, $W_{co}$, and $b_o$ represent model parameters of the output gate, $C'_t$ represents a memory cell of the $t^{th}$ left eye recursion, $C'_{t-1}$ represents a memory cell of a $(t-1)^{th}$ left eye recursion, tan h represents a hyperbolic tangent function, $H'_{t-1}$ represents a $(t-1)^{th}$ left eye hidden variable, and $H'_t$ represents the $t^{th}$ left eye hidden variable;

the processing circuitry is configured to calculate the $t^{th}$ right eye hidden variable based on $$i''_t = \sigma(W_{xi}*X''_t + W_{hi}*H''_{t-1} + W_{ci} \circ C''_{t-1} + b_i),$$

$$f''_t = \sigma(W_{xf}*X''_t + W_{hf}*H''_{t-1} + W_{cf} \circ C''_{t-1} + b_f),$$

$$o''_t = \sigma(W_{xo}*X''_t + W_{ho}*H''_{t-1} + W_{co} \circ C''_{t-1} + b_o),$$

$$C''_t = f''_t \circ C''_{t-1} + i''_t \circ \tanh(W_{xc}*X''_t + W_{hc}*H''_{t-1} + b_c), \text{ and}$$

$$H''_t = o''_t \circ \tanh(C''_t), \text{ where}$$

i″$_t$ represents a network input gate of a t$^{th}$ right eye recursion, X″$_t$ represents the t$^{th}$ right eye matching similarity and the (t−1)$^{th}$ right eye attention map, f″$_t$ represents a forget gate of the t$^{th}$ right eye recursion, o″$_t$ represents an output gate of the t$^{th}$ right eye recursion, C″$_t$ represents a memory cell of the t$^{th}$ right eye recursion, C″$_{t−1}$ represents a memory cell of a (t−1)$^{th}$ right eye recursion, H″$_{t−1}$ represents a (t−1)$^{th}$ right eye hidden variable, and H″$_t$ represents the t$^{th}$ right eye hidden variable.

14. The depth information determining apparatus according to claim 12, wherein the processing circuitry is configured to
process the t$^{th}$ left eye hidden variable with at least two fully connected layers, to obtain the t$^{th}$ left eye disparity cost; and
process the t$^{th}$ right eye hidden variable with the at least two fully connected layers, to obtain the t$^{th}$ right eye disparity cost.

15. The depth information determining apparatus according to claim 12, wherein
the processing circuitry is configured to calculate the t$^{th}$ predicted left eye disparity value based on d′*=Σ$_{d=1}^{Dmax}$d′*σ(−c′$_d$);
d′* represents the t$^{th}$ predicted left eye disparity value, D$_{max}$ represents a maximum quantity in different disparity maps, d′ represents a t$^{th}$ left eye disparity value, σ represents a sigmoid function, and c′$_d$ represents the t$^{th}$ left eye disparity cost;
the processing circuitry is configured to calculate the t$^{th}$ predicted right eye disparity value based on d″*=Σ$_{d=1}^{Dmax}$d″*σ(−c″$_d$); and
d″* represents the t$^{th}$ predicted right eye disparity value, c″$_d$ represents the t$^{th}$ right eye disparity cost, and d″ represents a t$^{th}$ right eye disparity value.

16. The depth information determining apparatus according to claim 13, wherein
the processing circuitry is configured to calculate the first depth information based on $$Z' = \frac{Bf}{d'^*};$$

Z′ represents the first depth information, d′* represents the t$^{th}$ predicted left eye disparity value, B represents a binocular camera spacing, and f represents a focal length;
the processing circuitry is configured to calculate the second depth information based on $$Z'' = \frac{Bf}{d''^*};$$

and
Z″ represents the second depth information, and d″* represents the t$^{th}$ predicted right eye disparity value.

17. A non-transitory computer-readable storage medium storing instructions, which when run on a computer, cause the computer to perform a depth information determining method for dual cameras, the depth information determining method comprising:
obtaining a t$^{th}$ left eye matching similarity from a left eye image captured by a first camera of the dual cameras to a right eye image captured by a second camera of the dual cameras, and a t$^{th}$ right eye matching similarity from the right eye image to the left eye image, t being an integer greater than 1;
processing the t$^{th}$ left eye matching similarity and a (t−1)$^{th}$ left eye attention map with a neural network model, to obtain a t$^{th}$ left eye disparity map;
processing the t$^{th}$ right eye matching similarity and a (t−1)$^{th}$ right eye attention map with the neural network model, to obtain a t$^{th}$ right eye disparity map;
determining first depth information according to the t$^{th}$ left eye disparity map; and
determining second depth information according to the t$^{th}$ right eye disparity map.

18. The non-transitory computer-readable storage medium according to claim 17, the method further comprising:
mapping the t$^{th}$ right eye disparity map to a left eye coordinate system, to obtain a t$^{th}$ left eye mapping disparity map;
generating a t$^{th}$ left eye attention map according to the t$^{th}$ left eye mapping disparity map and the t$^{th}$ left eye disparity map;
mapping the t$^{th}$ left eye disparity map to a right eye coordinate system, to obtain a t$^{th}$ right eye mapping disparity map; and
generating a t$^{th}$ right eye attention map according to the t$^{th}$ right eye mapping disparity map and the t$^{th}$ right eye disparity map.

19. The non-transitory computer-readable storage medium according to claim 18, wherein after the determining the first depth information and the determining the second depth information, the method further comprises:
obtaining a (t+1)$^{th}$ left eye matching similarity from the left eye image to the right eye image, and a (t+1)$^{th}$ right eye matching similarity from the right eye image to the left eye image;
processing the (t+1)$^{th}$ left eye matching similarity and the t$^{th}$ left eye attention map with the neural network model, to obtain a (t+1)$^{th}$ left eye disparity map;
processing the (t+1)$^{th}$ right eye matching similarity and the t$^{th}$ right eye attention map with the neural network model, to obtain a (t+1)$^{th}$ right eye disparity map;
determining third depth information according to the (t+1)$^{th}$ left eye disparity map; and
determining fourth depth information according to the (t+1)$^{th}$, right eye disparity map.

20. The non-transitory computer-readable storage medium according to claim 17, wherein
the processing the t$^{th}$ left eye matching similarity and the (t−1)$^{th}$ left eye attention map includes:
obtaining a t$^{th}$ left eye hidden variable through calculation according to the t$^{th}$ left eye matching similarity and the (t−1)$^{th}$ left eye attention map by using a convolutional long short-term memory (ConvLSTM) network;
obtaining a t$^{th}$ left eye disparity cost according to the t$^{th}$ left eye hidden variable; and
calculating a t$^{th}$ predicted left eye disparity value according to the t$^{th}$ left eye disparity cost, the t$^{th}$ predicted left eye disparity value being used for generating the t$^{th}$ left eye disparity map; and
the processing the t$^{th}$ right eye matching similarity and the (t−1)$^{th}$ right eye attention map includes:
obtaining a t$^{th}$ right eye hidden variable through calculation according to the t$^{th}$ right eye matching similarity and the (t−1)$^{th}$ right eye attention map by using the ConvLSTM network;

obtaining a $t^{th}$ right eye disparity cost according to the $t^{th}$ right eye hidden variable; and calculating a $t^{th}$ predicted right eye disparity value according to the $t^{th}$ right eye disparity cost, the $t^{th}$ predicted right eye disparity value being used for generating the $t^{th}$ right eye disparity map.

* * * * *